United States Patent
Makita et al.

(10) Patent No.: US 6,705,668 B1
(45) Date of Patent: Mar. 16, 2004

(54) REINFORCING WAVEFORM STRUCTURE FOR BODY FRAME OF VEHICLE

(75) Inventors: Masashi Makita, Kanagawa-ken (JP); Yuuichi Oki, Kanagawa-ken (JP)

(73) Assignee: Nissan Motor Co., Ltd., Kanagawa-Ken (JP)

(*) Notice: Subject to any disclaimer, the term of this patent is extended or adjusted under 35 U.S.C. 154(b) by 0 days.

(21) Appl. No.: 10/337,824

(22) Filed: Jan. 8, 2003

(30) Foreign Application Priority Data

| Jan. 16, 2002 | (JP) | P2002-007907 |
| May 17, 2002 | (JP) | P2002-143235 |
| May 17, 2002 | (JP) | P2002-143245 |

(51) Int. Cl.⁷ .............................................. B62D 21/15
(52) U.S. Cl. .................................. 296/187.03; 296/30
(58) Field of Search ................... 296/30, 187.01, 296/187.03, 187.08, 187.09, 187.1, 187.11, 187.12, 193.06, 203.01, 203.02, 203.03, 203.04, 204, 205, 209

(56) References Cited

U.S. PATENT DOCUMENTS

| 3,132,891 A | * | 5/1964 | Pyuro et al. ................ 296/204 |
| 3,140,891 A | * | 7/1964 | Shreffler ..................... 296/1.08 |
| 3,779,595 A | * | 12/1973 | Suzuki et al. .......... 296/187.05 |
| 4,684,151 A | * | 8/1987 | Drewek ....................... 280/784 |
| 4,702,515 A | * | 10/1987 | Kato et al. ............. 296/187.01 |
| 4,848,835 A | * | 7/1989 | DeRees ....................... 296/204 |
| 5,011,201 A | * | 4/1991 | Takahashi et al. ..... 296/203.02 |
| 5,033,593 A | * | 7/1991 | Kazuhito .................... 188/377 |
| 5,048,345 A | * | 9/1991 | Hagiwara et al. ............. 73/788 |
| 5,118,160 A | * | 6/1992 | Kitagawa et al. ....... 296/187.03 |
| 5,370,438 A | * | 12/1994 | Mori et al. ............. 296/203.02 |
| 5,913,565 A | * | 6/1999 | Watanabe .............. 296/187.03 |
| 5,984,403 A | | 11/1999 | Kuroda ........................ 296/189 |
| 6,152,521 A | * | 11/2000 | Hayashi et al. ......... 296/187.09 |
| 6,523,884 B2 | * | 2/2003 | Czaplicki et al. ...... 296/187.03 |

FOREIGN PATENT DOCUMENTS

| JP | 58116268 | 11/1983 |
| JP | 05319301 | 3/1993 |
| JP | 11-235963 | 8/1999 |
| JP | 2001-8840 | 1/2001 |
| JP | 2001-180518 | 7/2001 |

* cited by examiner

Primary Examiner—D. Glenn Dayoan
Assistant Examiner—Paul Chenevert
(74) Attorney, Agent, or Firm—McDermott, Will, Emery

(57) ABSTRACT

A reinforcing structure is provided to attain sufficient reinforcing effect for a body frame without increasing a weight of a vehicle. The reinforcing structure includes a front pillar (3) whose peripheral wall has an outer panel (13) and a reinforcement (14) to provide a double wall structure, and an adjusting mechanism (15) for making a buckling-mode waveform of the outer panel (13) in a substantially-reversed phase to a buckling-mode waveform of the reinforcement (14). The adjusting mechanism (15) includes a plurality of beads (16) formed on a top wall of the reinforcement (14). Owing to the deformation of the outer panel (13) in a substantially-reversed phase to the deformation of the reinforcement (14), a resistance force due to contact between the outer panel (13) and the reinforcement (14) allows a deformation of the front pillar (3) to be is restricted to enhance reinforcing effect of the reinforcing structure.

27 Claims, 40 Drawing Sheets

FIG.7
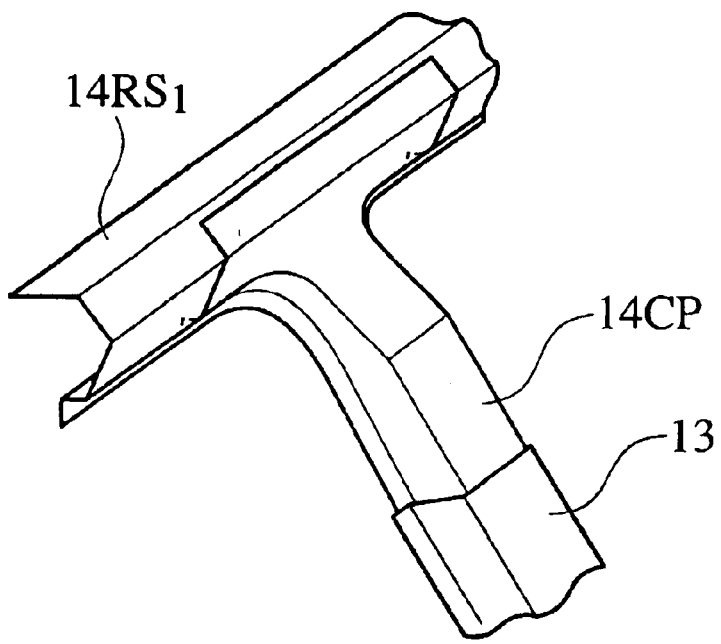
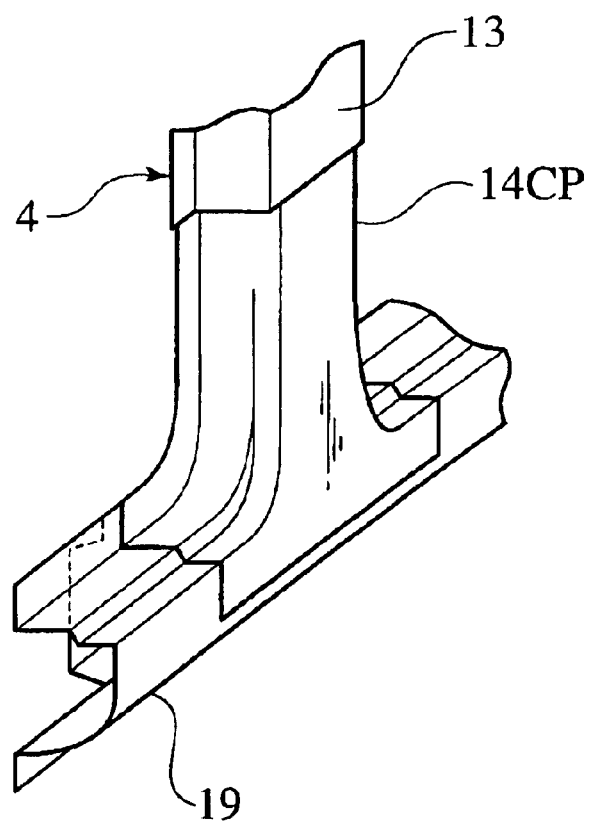

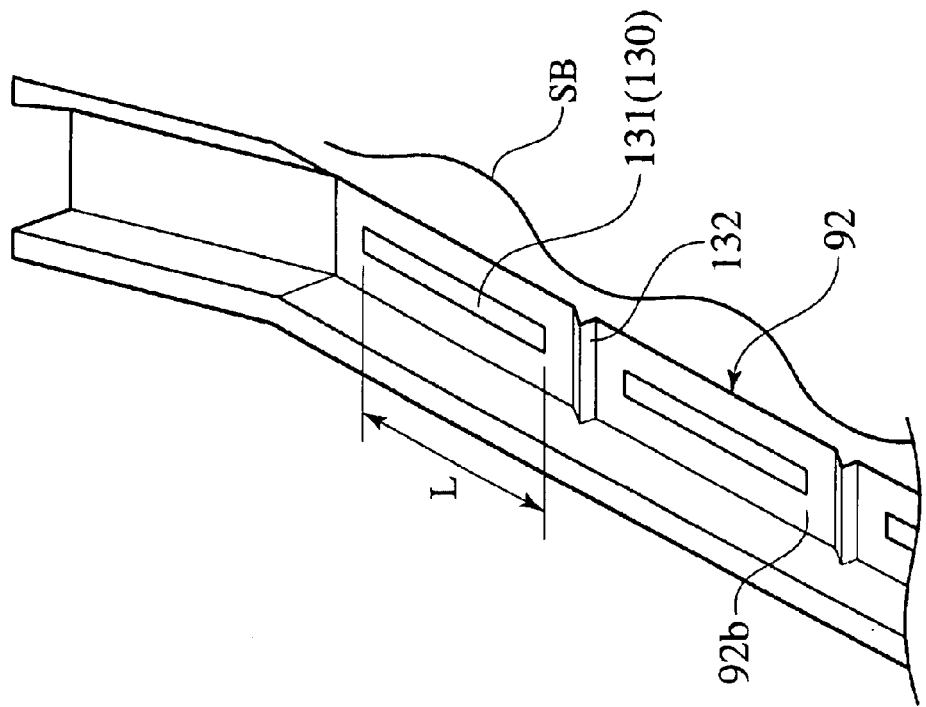
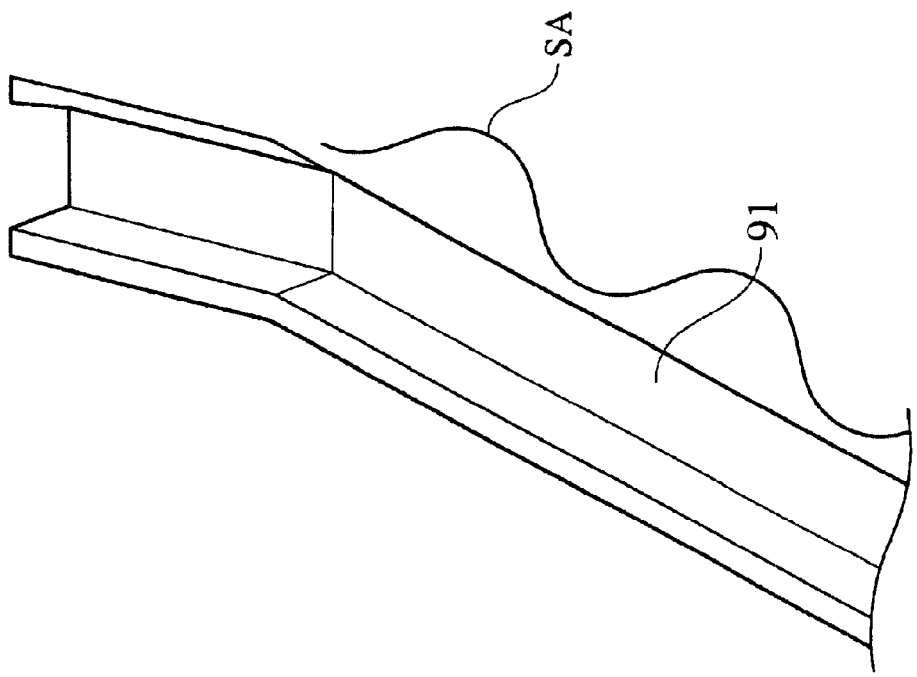

FIG. 43
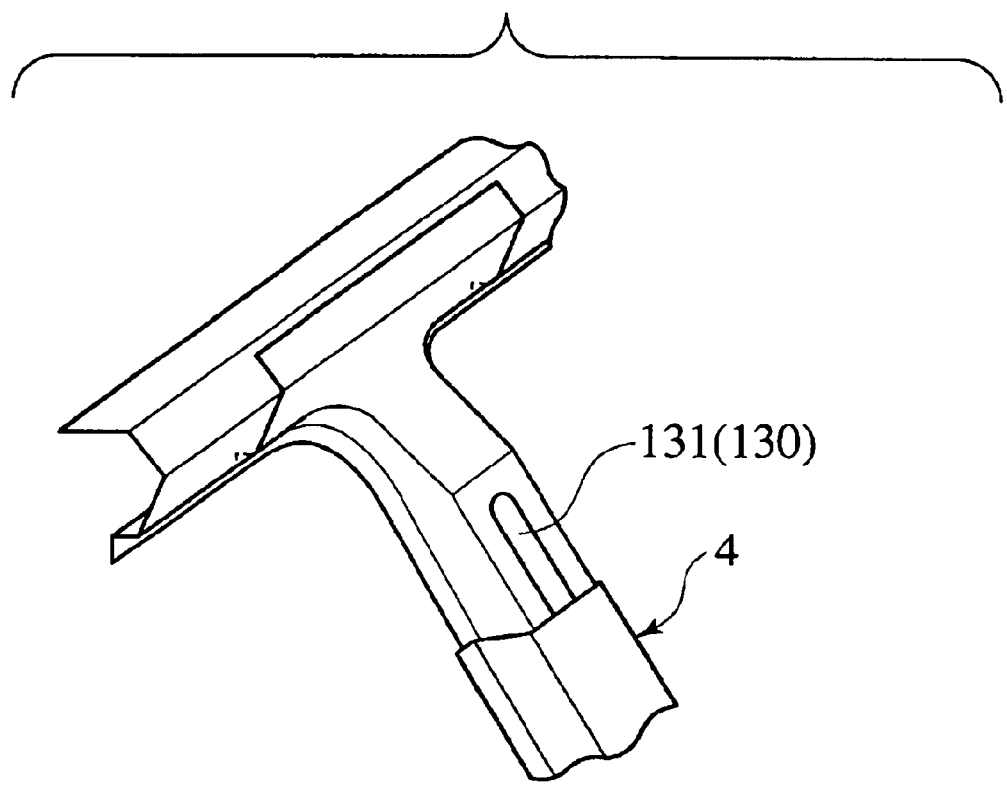
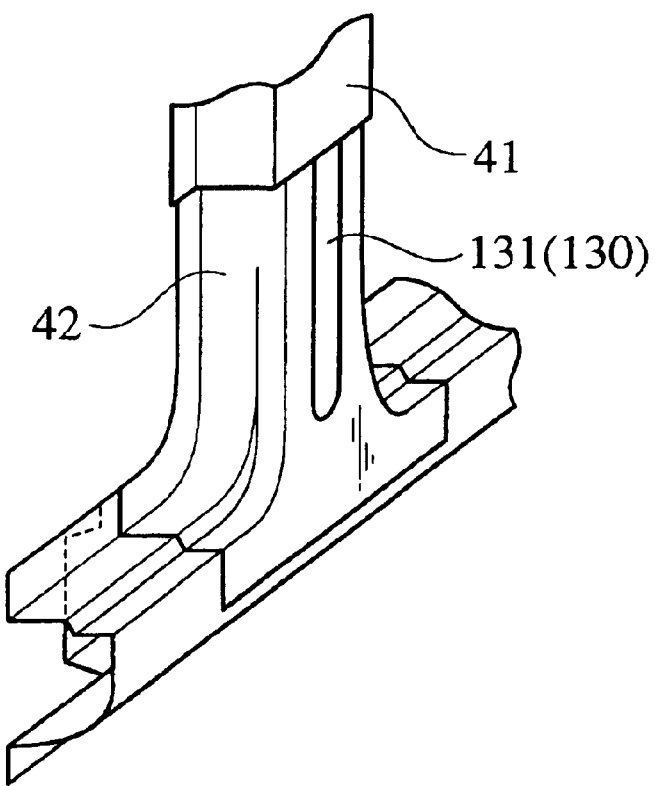

REINFORCING WAVEFORM STRUCTURE FOR BODY FRAME OF VEHICLE

BACKGROUND OF THE INVENTION

1. Field of the Invention

The present invention relates to a reinforcing structure for a body frame of a vehicle.

2. Description of Related Art

In general, the body frame of a vehicle is formed by various framework members each having a closed section, for example, pillars, side members, cross members, side sills, etc. In assembling, these framework members are connected with each other by means of welding etc. In order to enhance rigidity of the assembly while reducing its weight, it has been attempted to fill up the closed section of the framework member with foaming urethane. Alternatively, it has been attempted to insert a reinforcement into the closed section of the framework member (see Japanese Patent Application Laid-open Nos. 2001-8840 and 11-235963).

Additionally, Japanese Patent Application Laid-open No. 2001-180518 discloses a reinforcing structure for body frames of an automobile. In this reinforcing structure, a framework member as a constituent of a vehicle frame is formed by an outer member having a hollow (closed) section and a reinforcement inside the outer member. By the integral forming method, the reinforcement is shaped so as to overlap the whole inside of the outer member, thereby reinforcing it effectively and lightly.

SUMMARY OF THE INVENTION

In the former structures adopting the foaming urethane and the reinforcement, there is a tendency of increasing a charging amount of the foaming urethane and a thickness of the reinforcement in order to ensure sufficient reinforcing effect, causing a weight of the vehicle body to be increased.

In the latter structure, as the reinforcement is configured so as to follow an uneven inside profile of the outer member, the strength distribution of an integrated element (i.e. the outer member and the reinforcement) is still unchanged in comparison with that of the outer member though its strength is improved by the addition of the reinforcement. Therefore, as to the position of folding deformation, there is no difference between the outer member with the reinforcement and the outer member with no reinforcement. That is, despite the whole area of the outer member being covered with the reinforcement, it merely has effect to reinforce such a deformable part(s) of the outer member, exhibiting an ineffective reinforcing effect.

In such a situation, it is an object of the present invention to provide a reinforcing structure for a body frame, which can provide the body frame with a sufficient reinforcing effect without increasing the weight of the vehicle body.

According to the present invention, the above-mentioned object is accomplished by a reinforcing structure for a body frame of a vehicle, comprising:

a framework member having two wall members adjacent to each other to provide a peripheral wall of the framework member with a double wall structure; and an adjusting mechanism for adjusting respective buckling-mode waveforms of the two wall members to be different from each other.

BRIEF DESCRIPTION OF THE DRAWINGS

FIG. 7 is a perspective view showing the structure of a reinforcement for a center pillar (part) of the first embodiment of the invention;

FIG. 42A is a perspective view of an outer member in accordance with a ninth modification of the second embodiment and FIG. 42B is a perspective view of a reinforcement in accordance with the ninth modification;

FIG. 43 is a perspective view showing a tenth modification of the second embodiment;

DESCRIPTION OF THE PREFERRED EMBODIMENT

Referring to accompanying drawings, various embodiments of the present invention will be described below. The following descriptions are divided broadly into three embodiments each containing various modifications. In advance of describing these embodiments, we first describe a body frame of an automobile to which the present invention is to be applied.

Figure 1:
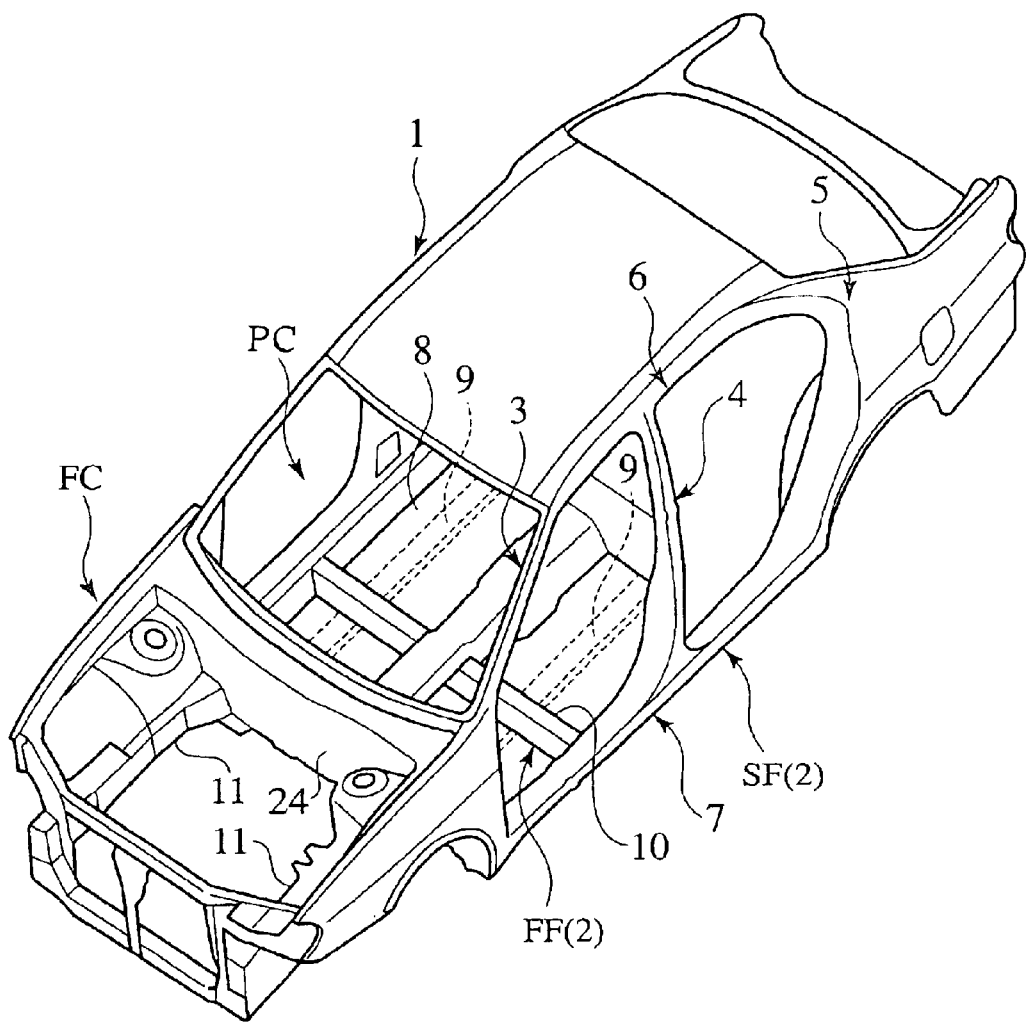
FIG. 1 is a perspective view showing a body frame of an automobile, to which the present invention is applied.

FIG. 1 is a perspective view of the outward appearance of the automobile. In this figure, reference numeral 1 designates a vehicle body, letters PC a passenger cabin in the vehicle body 1, and reference numeral 2 designates a body frame.

As one constituent of the body frame 2, a side frame SF on one side of the vehicle body 1 is formed by framework members extending in an up-and-down direction of the vehicle and other framework members extending in a fore-and-aft direction of the vehicle. The former framework members include a front pillar 3, a center pillar 4, a rear pillar 5 and so on. The latter framework members include a roof side rail 6 connected to respective upper ends of the front pillar 3, the center pillar 4 and the rear pillar 5, and a side sill 7 connected to respective lower ends of the front pillar 3, the center pillar 4 and the rear pillar 5.

A floor frame FF also forming the body frame 2 includes a pair of extension side members 9 as framework members arranged under both sides of a floor panel 8 to extend in the fore-and-aft direction of the vehicle, a cross member 10 as a framework member arranged under the floor panel 8 to extend in a width direction of the vehicle, and also the above side sills 7 on both sides of the vehicle body 1.

The extension side members 9 are in the form of respective backward extensions of two side members 11 as framework members in the fore-and-aft direction of the vehicle. Therefore, the extension side member 9 may be called "side member extension" in this art, alternatively. The extension side members 9 are welded to the lower face of the floor panel 8.

1st. Embodiment

Figure 2:
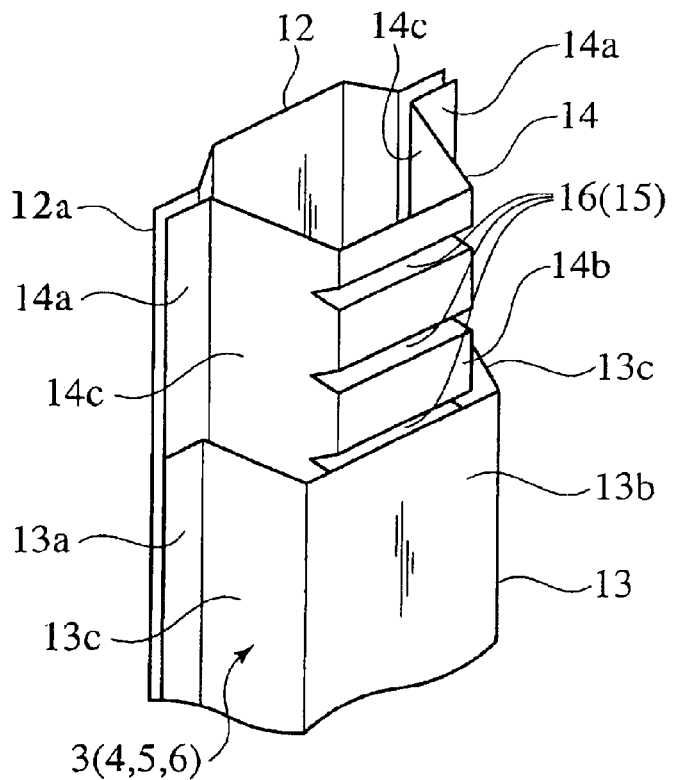
FIG. 2 is a perspective view explaining the structure of a pillar (part) and a roof side rail (part), in accordance with a first embodiment of the present invention.

FIG. 2 shows the first embodiment of the present invention. In common with the above pillars 3–5 and also the roof side rail 6, each framework member includes an inner panel 12 formed with a substantial hat-shaped section and an outer panel 13 formed with a substantial hat-shaped section whose drawing depth is larger than that of the inner panel 12. In assembling, the panel 12 is connected with the panel 13 by allowing respective flanges 12a, 13a of the panels 12, 13 to abut on each other and continuously spot-welding the flanges 12a, 13a together, providing a closed section.

In common with the upper framework members (i.e. the front pillar 3, the center pillar 4, the rear pillar 5, the roof side rail 6), according to this embodiment, a peripheral wall on the side of the outer panel 13 has a double wall structure composed of the outer panel 13 and a reinforcement 14 arranged inside the outer panel 13. Thus, the outer panel 13 and the reinforcement 14 form two wall members of the invention.

The reinforcement 14 is formed with a hat-shaped section substantially identical to that of the outer panel 13. Each flange 14a of the reinforcement 14 on each side thereof is pinched between the flange 12a of the inner panel 12 and the flange 13a of the outer panel 13 and welded to these flanges 12a, 13a for integration.

The substantial hat-shaped section of the outer panel 13 is formed by a top wall 13b and side walls 13c on both sides of the top wall 13b. Similarly, the substantial hat-shaped section of the reinforcement 14 is formed by a top wall 14b and side walls 14c on both sides of the top wall 14b. In arrangement, a required clearance is defined between the top wall 13b of the outer panel 13 and the top wall 14b of the reinforcement 14. Additionally, a required clearance is defined between each side wall 13c of the outer panel 13 and each side wall 14c of the reinforcement 14.

According to the invention, this assembly having the inner panel 12, the outer panel 13 and the reinforcement 14 is provided with a mechanism 15 for making a "buckling-mode" waveform SB (see FIG. 11) of the reinforcement 14 a reversed phase (antiphase) of a "buckling-mode" waveform SA (see FIG. 11) of the outer panel 13.

In order to attain the above-mentioned buckling-mode waveform SB, according to the first embodiment, the mechanism 15 is formed by a plurality of beads 16 on the top wall 14b of the reinforcement 14. Each bead 16 is formed so as to straddle ridgelines between the top wall 14b and the side walls 14c and also shaped to have a triangular section.

The so-formed beads 16 are juxtaposed on the top wall 14b along the longitudinal direction of the reinforcement 14.

Figure 3:
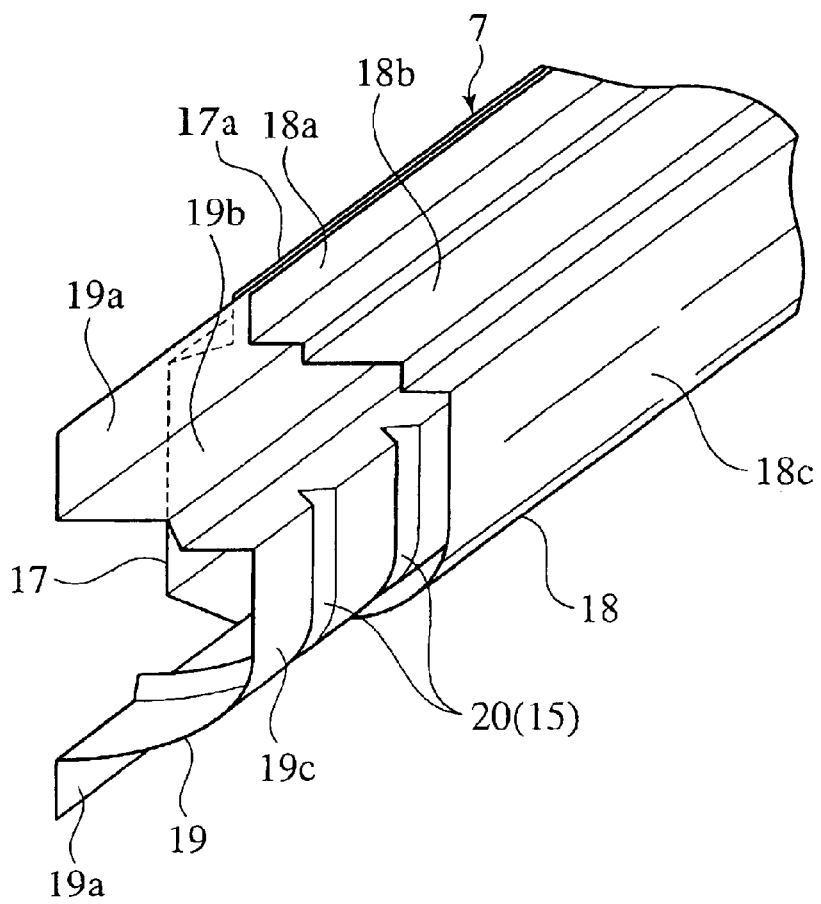
FIG. 3 is a perspective view explaining the structure of a side sill (part) of the first embodiment of the invention.

FIG. 3 shows the above side sill 7 in accordance with the first embodiment of the present invention. The side sill 7 includes an inner panel 17 formed with a substantial hat-shaped section and an outer panel 18 formed with a substantial hat-shaped section whose drawing depth is larger than that of the inner panel 17. In assembling, these panels 17, 18 are united by allowing respective flanges 17a, 18a of the panels 17, 18 to abut on each other and further spot-welding the flanges 17a, 18a together, providing a closed section.

The outer panel 18 has an upper wall 18b and a side wall 18c. The upper wall 18b is shaped in a step manner with multistage, while the lower part of the side wall 18c is shaped in a curve to provide a rounded sill bottom, whereby the outer panel 18 has a different hat-shaped section.

In the side sill 7, a peripheral wall on the side of the outer panel 18 has a double wall structure composed of the outer panel 18 and a reinforcement 19 arranged inside the outer panel 18. Thus, the outer panel 18 and the reinforcement 19 form two wall members in the side sill 7 of the invention.

The reinforcement 19 is formed with a different hat-shaped section substantially identical to that of the outer panel 18. Similarly, the different hat-shaped section of the reinforcement 19 is formed by a top wall 19b and a rounded side walls 19c. Each flange 19a of the reinforcement 19 on each side thereof is pinched between the flange 17a of the inner panel 17 and the flange 18a of the outer panel 18 and welded to these flanges 17a, 18a for integration.

In arrangement, a required clearance is defined between the top wall 18b of the outer panel 18 and the top wall 19b of the reinforcement 19. Additionally, a required clearance is defined between the side wall 18c of the outer panel 18 and the side wall 19c of the reinforcement 19.

As the mechanism 15 for making a "buckling-mode" waveform SB of the reinforcement 19 a reversed phase of a "buckling-mode" waveform SA of the outer panel 18, there are formed a plurality of beads 20 on the side wall 19c of the reinforcement 19. Each bead 20 is shaped to have a triangular section. The so-formed beads 20 are juxtaposed on the side wall 19c along the longitudinal direction of the reinforcement 19.

Each bead 20 is formed so as to straddle a ridgeline between the top wall 19b and the side wall 19c and another ridgeline between the side wall 19c and the lower flange 19a.

Figure 4:
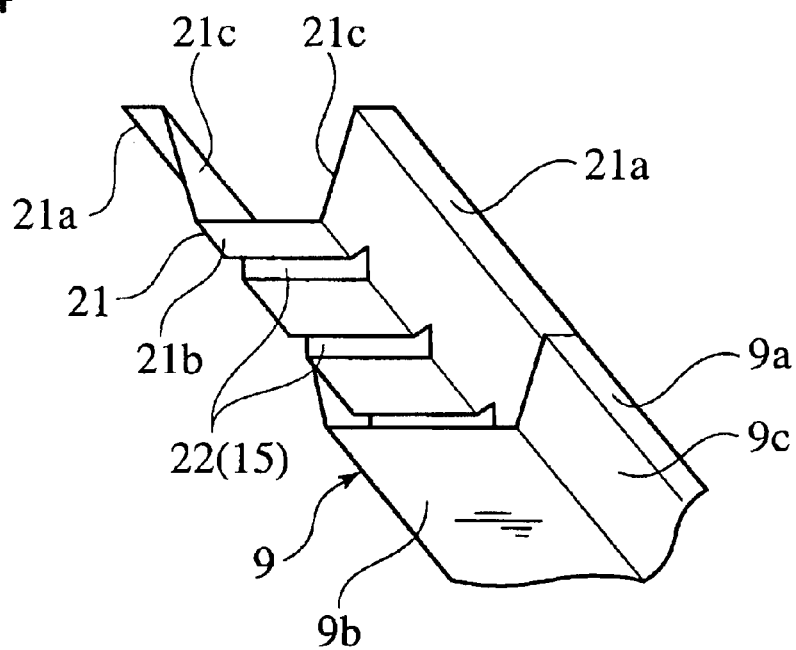
FIG. 4 is a perspective view explaining the structure of an extension side member (part) of the first embodiment of the invention.
Figure 5:
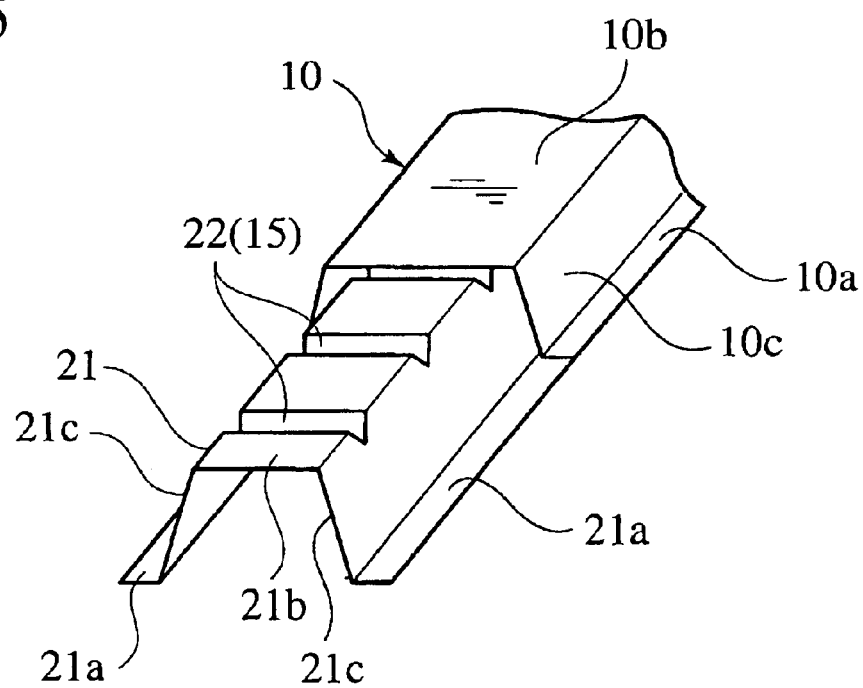
FIG. 5 is a perspective view explaining the structure of a cross member (part) of the first embodiment of the invention.

FIG. 4 shows the above extension side member 9 and FIG. 5 shows the above cross member 10, in accordance with the first embodiment of the present invention.

The extension side member 9 is welded to a lower face of the floor panel 8 through flanges 9a, forming a closed section. Also, the cross member 10 is welded to the upper face of the floor panel 8 through flanges 10a, forming a closed section.

In the extension side member 9, its peripheral wall has a double wall structure composed of the extension side member 9 itself and a reinforcement 21 arranged inside the member 9. In the cross member 10, its peripheral wall has a double wall structure composed of the cross member 10 itself and another reinforcement 21 arranged inside the member 10. Thus, the extension side member 9 and the reinforcement 21 correspond to two wall members forming the double wall structure of the extension side member 9. The cross member 10 and the reinforcement 21 correspond to two wall members forming the double wall structure of the cross member 10.

The extension side member 9 has a top wall 9b and a pair of side walls 9c on both sides of the top wall 9b, providing a hat-shaped section. Similarly, the cross member 10 has a top wall 10b and a pair of side walls 10c on both sides of the top wall 10b, providing a hat-shaped section.

The reinforcement 21 is formed with a hat-shaped section substantially identical to the above section of the extension side member 9 and also the above section of the cross member 10. That is, in common with FIGS. 4 and 5, the reinforcement 21 has a top wall 21b and a pair of side walls 21c on both sides of the top wall 21b.

In FIG. 4, each flange 21a of the reinforcement 21 on each side thereof is pinched between the flange 9a of the extension side member 9 and the floor panel 8. In FIG. 5, each flange 21a of the reinforcement 21 on each side thereof is pinched between the flange 10a of the cross member 10 and the floor panel 8.

In arrangement of the extension side member 9, a required clearance is defined between the top wall 21b of the reinforcement 21 and the top wall 9b of the extension side member 9. Additionally, a required clearance is defined between each side wall 9c of the extension side member 9 and each side wall 21c of the reinforcement 21. Also in arrangement of the cross member 10, a required clearance is defined between the top wall 21b of the reinforcement 21 and the top wall 9b of the extension side member 9. Additionally, a required clearance is defined between each side wall 9c of the extension side member 9 and each side wall 21c of the reinforcement 21.

As the mechanism 15 for making a "buckling-mode" waveform SB of the reinforcement 21 a reversed phase of each "buckling-mode" waveform SA of the extension side member 9 and the cross member 10, there are formed a plurality of beads 22 on the top wall 21b of the reinforcement 21. Each bead 22 is shaped to have a triangular section. The so-formed beads 22 are juxtaposed on the top wall 21b along the longitudinal direction of the reinforcement 21.

Similarly to the beads 16 of the reinforcement 14, each bead 22 is formed so as to straddle ridgelines between the top wall 21b and the side walls 21c on both sides of the reinforcement 21.

Figure 6:
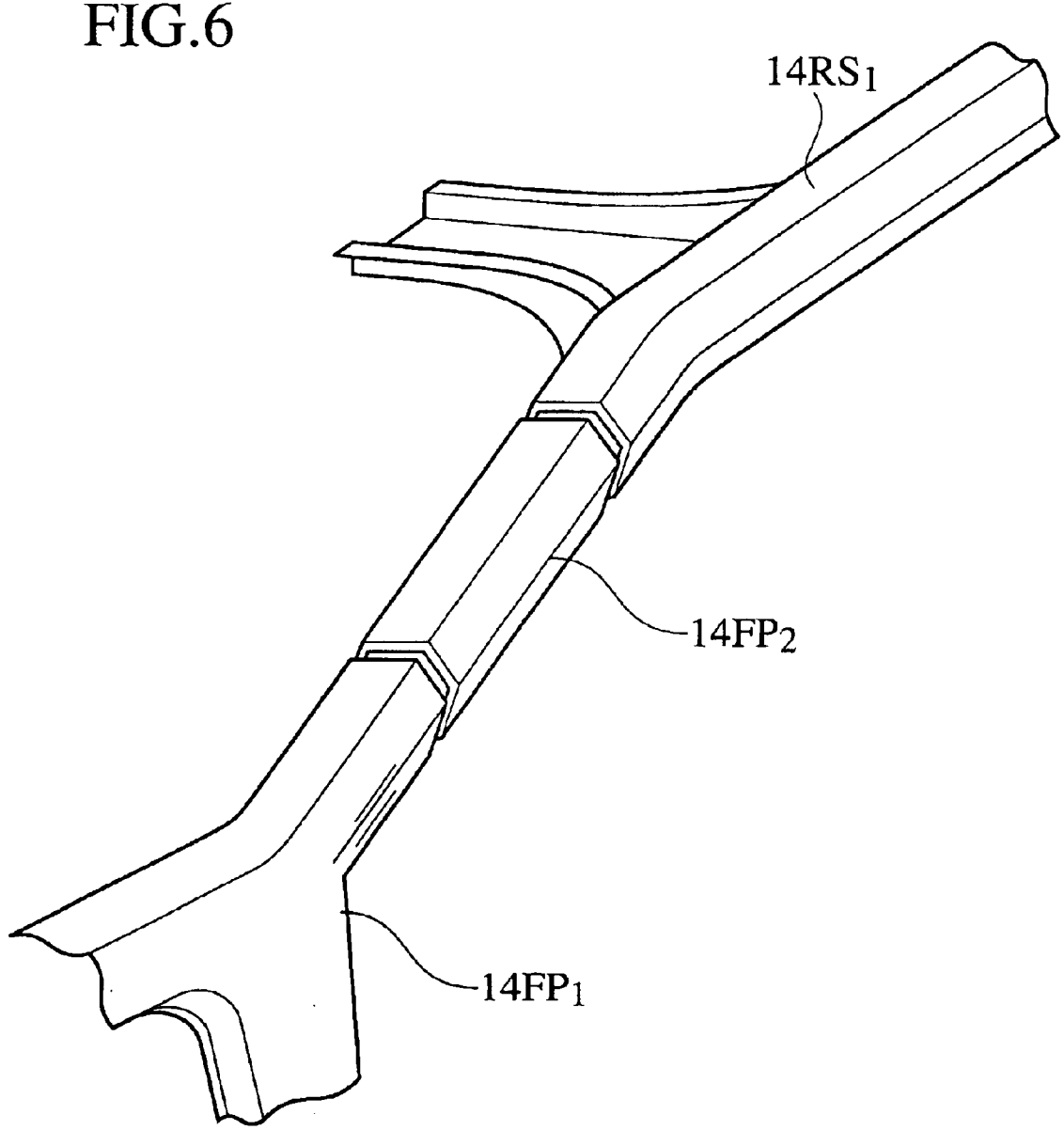
FIG. 6 is a perspective view showing the structure of a reinforcement for a front pillar (part) of the first embodiment of the invention.

Corresponding to a division of the front pillar 3 into a pillar upper piece and a pillar lower piece, the reinforcement 14 is also divided into a lower reinforcement part 14FP$_1$ and an upper reinforcement part 14FP$_2$, as shown in FIG. 6. In assembling, the reinforcement parts 14FP$_1$, 14FP$_2$ forming the front pillar 3 and the reinforcement 14RS forming the roof side rail 6 may be connected with each other in succession. Alternatively, the reinforcement parts 14FP$_1$, 14FP$_2$ and the reinforcement 14RS may be discontinuously arranged without connecting their ends with each other.

As for the connection between the center pillar 4 and the roof side rail 6, as shown in FIG. 7, the top end of the reinforcement 14CP of the center pillar 4 is fitted and welded to the periphery of the reinforcement 14RS of the roof side rail 6. Similarly, as for the connection between the center pillar 4 and the side sill 7, the lower end of the reinforcement 14CP of the center pillar 4 is fitted and welded to the periphery of the reinforcement 19 of the side sill 7.

Figure 8:
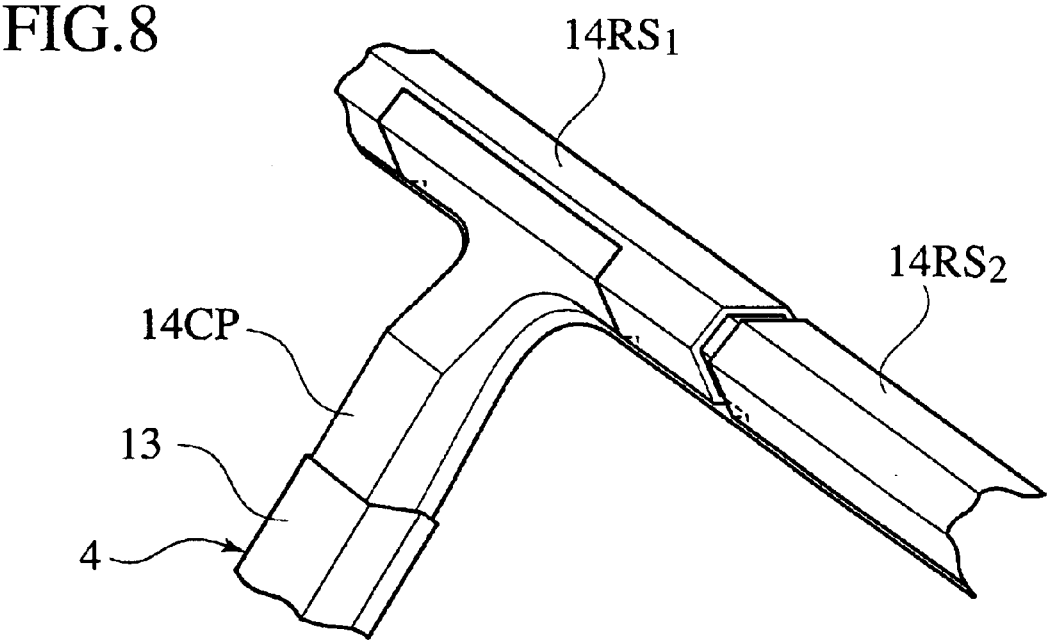
FIG. 8 is a perspective view showing the structure of a reinforcement for the roof side rail (part) of the first embodiment of the invention.
Figure 9:
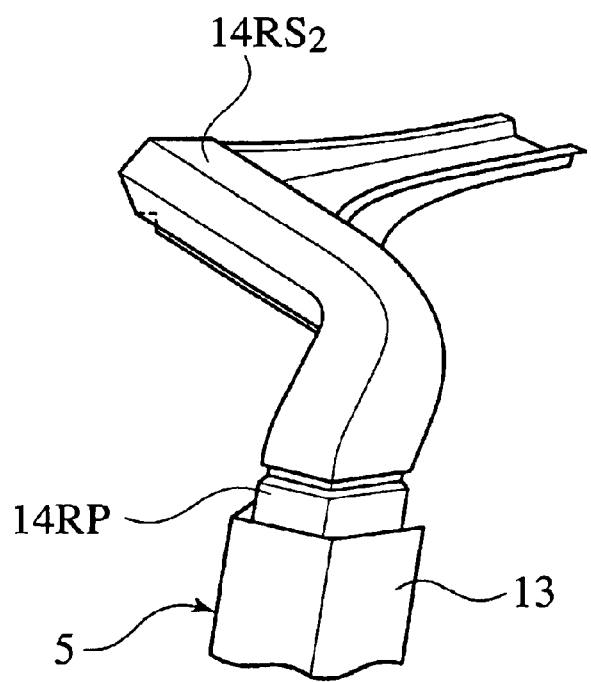
FIG. 9 is a perspective view showing the structure of a reinforcement for a rear pillar (part) of the first embodiment of the invention.

Further, the reinforcement 14 of the roof side rail 6 is also divided into a front reinforcement part 14RS$_1$ and a rear reinforcement part 14RS$_2$. In assembling, as shown in FIG. 8, the reinforcement parts 14RS$_1$, 14RS$_2$ may be connected with each other through their ends, in succession. Alternatively, the reinforcement parts 14RS$_1$, 14RS$_2$ may be discontinuously arranged without connecting their ends with each other. Additionally, the rear reinforcement part 14RS$_2$ and the reinforcement 14RP of the rear pillar 5 may be connected with each other through their ends continuously, as shown in FIG. 9. Alternatively, the reinforcement part 14RS$_2$ and the reinforcement 14RP may be discontinuously arranged without connecting their ends with each other.

Figure 10:
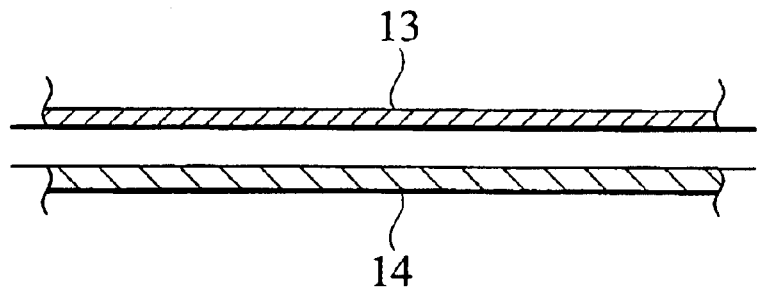
FIG. 10 is a sectional view of a double wall structure (part) of the first embodiment of the invention, showing its condition before being deformed.
Figure 11:
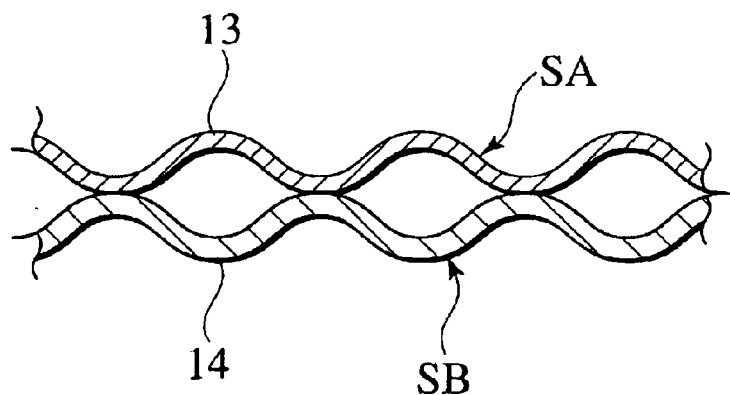
FIG. 11 is a sectional view of the double wall structure (part) of the first embodiment of the invention, showing its condition after being deformed.

According to the embodiment, when the above-mentioned framework member (e.g. the body frame 2, the center pillar 4, the rear pillar 5, the roof side rail 6, the side sill 7, the extension side member 9, the cross member 10, etc.) is buckled like bellows in the longitudinal direction by an axial collision load applied thereon, the double wall structure in the framework member changes from a parallel condition of FIG. 10 to a deformed condition of FIG. 11. That is, owing to the provision of the mechanism 15, the outer wall member (13, 18, 9, 10) is deformed with the buckling-mode waveform SA in the form of bellows, while the inner wall member (14, 19, 21) is deformed with the buckling-mode waveform SB having a reversed phase of the waveform SA. Consequently, both of the inner and outer wall members come into intensive contact with each other at respective peaks of the waveform SB and respective troughs of the waveform SA.

Figure 12:
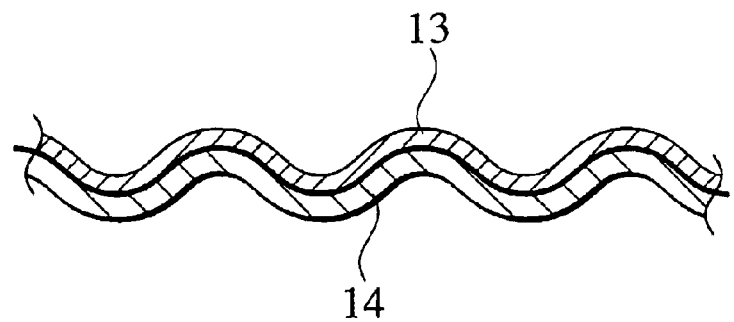
FIG. 12 is a sectional view of a comparative double wall structure (part) against the double wall structure of the present invention, showing a condition where constituents of the comparative double wall structure are deformed in synchronous phase.
Figure 13:
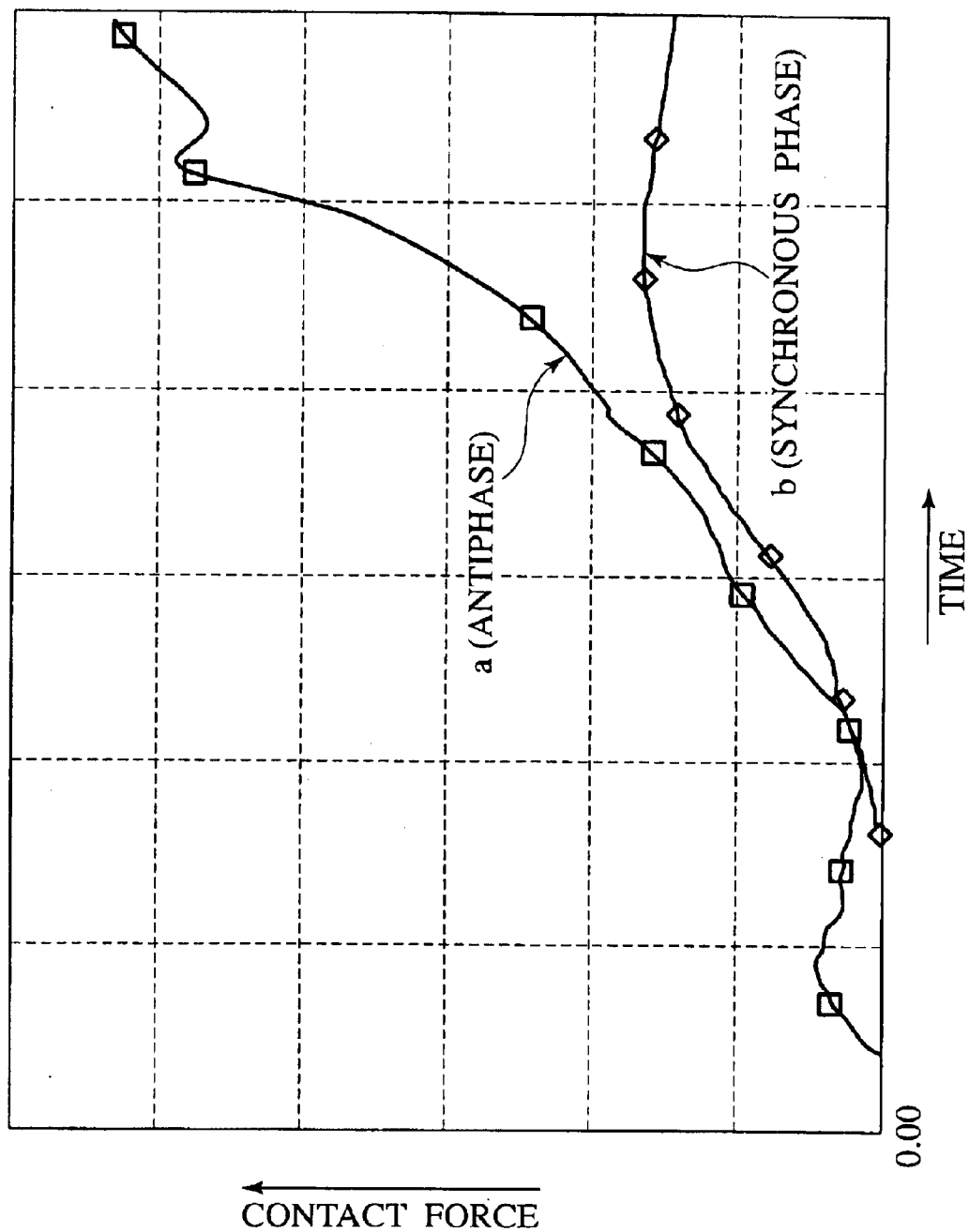
FIG. 13 is a graph showing a comparison in contact force by deformation between the double wall structure of the invention and the comparative double wall structure whose constituents are deformed in synchronous phase.

FIG. 13 shows a comparison of the above deformation with the deformation with a buckling-mode waveform in synchronous phase of FIG. 12. According to the embodiment, as shown with a line a of FIG. 13, the above structure enabling a deformation in reversed phase (antiphase) allows a contact force (resistance force) to be remarkably enhanced in comparison with the conventional structure where the members 13, 14 are deformed in synchronous phase (see line b of FIG. 13).

Figure 14:
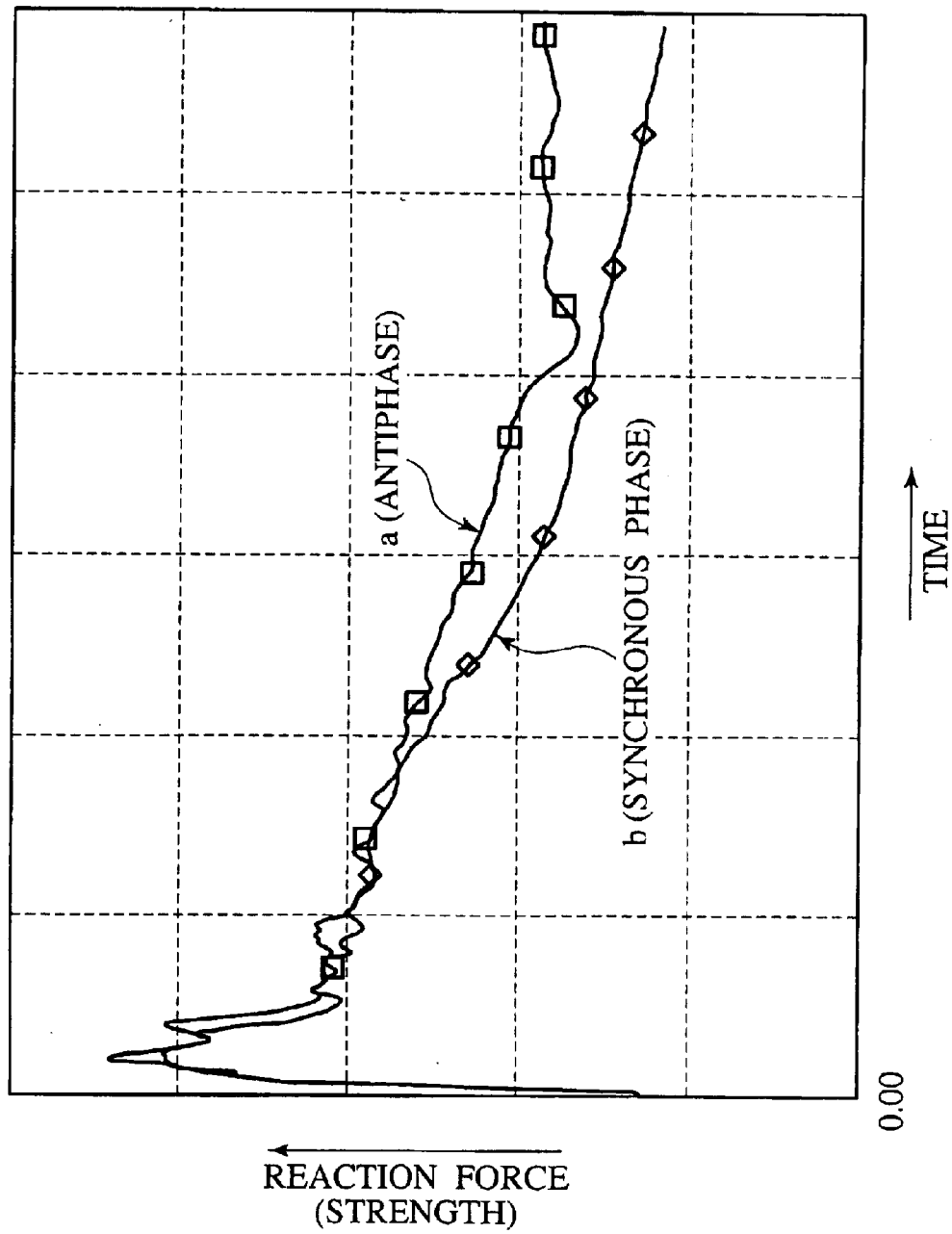
FIG. 14 is a graph showing a comparison in reaction force by deformation between the double wall structure of the invention and the comparative double wall structure whose constituents are deformed in synchronous phase.
Figure 15:
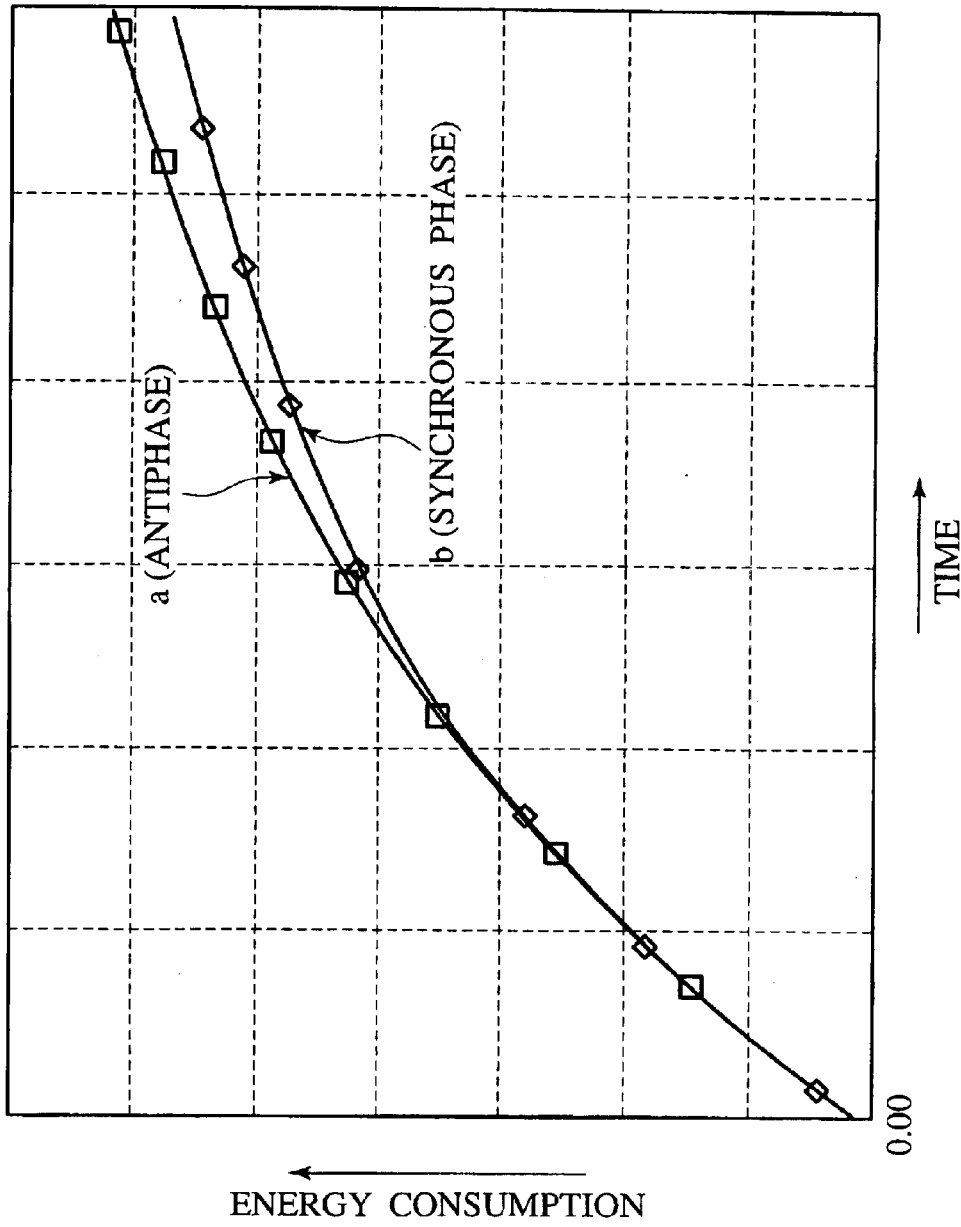
FIG. 15 is a graph showing a comparison in energy consumption by deformation between the double wall structure of the invention and the comparative double wall structure whose constituents are deformed in synchronous phase.

FIG. 14 is a comparative graph of reaction force (strength) between the deformation in reversed phase (line a) and the "synchronous" deformation in phase (line b). According to the embodiment, the deformation in reversed phase allows a reaction force of the framework members to be increased thereby restricting its deformation. Additionally, as shown with lines a (reversed phase) and b(synchronous phase) in a comparative graph of energy consumption of FIG. 15, it is possible to increase an energy consumption by allowing the opposing members to be deformed in revered phase.

Thus, it is possible to enhance the reinforcing effect of a framework member without increasing plate thicknesses of the wall members forming the framework member, thereby improving the structure's performance against a collision.

Again, since the mechanism 15 for making the above buckling-mode waveform a reversed phase is formed by the beads 16, 20 or 22 in the reinforcements 14, 18 or 21 inside the double wall structure in the above-mentioned embodiment, it is possible to obtain the above-mentioned buckling-mode waveform SB by adjusting a pitch (interval) of the beads suitably.

In the above-mentioned embodiment, the beads 16, 22 are formed on the top walls 14b, 21b of the reinforcements 14, 21, respectively. In the modifications, the beads may be formed in the other part of the reinforcement.

(1st. Modification)

Figure 16:
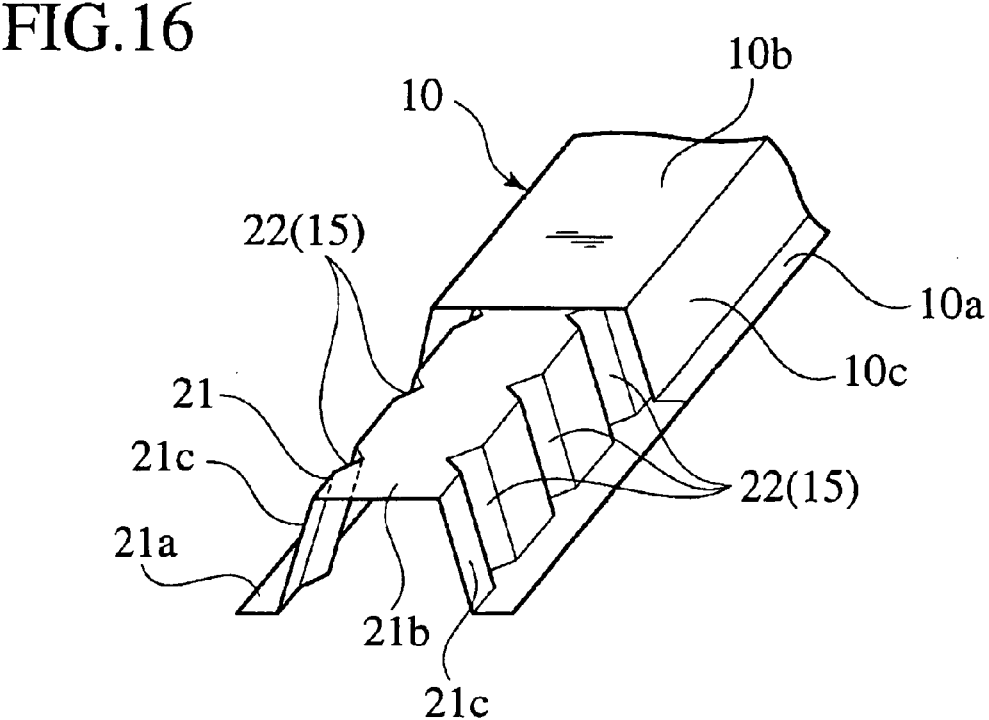
FIG. 16 is a perspective view similar to FIG. 5, explaining the structure of a cross member (part) of a first modification of the first embodiment of the invention.

FIG. 16 shows the first modification of the first embodiment. In this modification, as representatively illustrated by the cross member 10 of the figure, the beads 22 are formed on the side walls 21c on both sides of the top wall 21b of the reinforcement 21.

(2nd. Modification)

Figure 17:
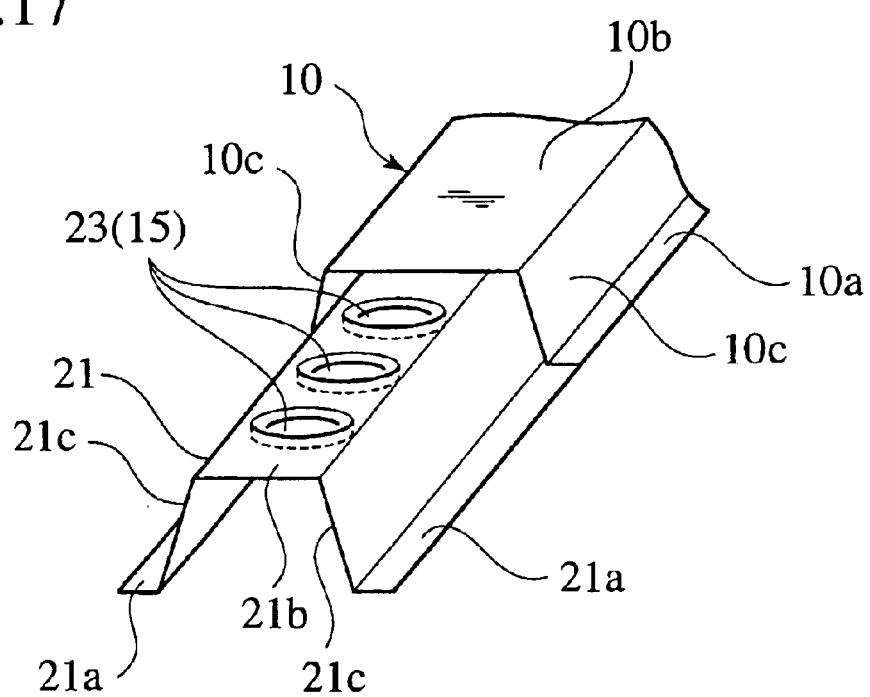
FIG. 17 is a perspective view similar to FIG. 5, explaining the structure of a cross member (part) of a second modification of the first embodiment of the invention.

FIG. 17 shows the second modification of the first embodiment. In the second modification, the top wall 21b of the reinforcement 21 has embossed parts 23 formed to project inward, in place of the beads 22 in both of the first embodiment and the first modification.

Each embossed part 23 is in the form of a long oval having a long axis in the width direction of the top wall 21b.

Therefore, according to the second modification, since the embossed parts 23 become inducing points of buckling as well as the above-mentioned beads 20, it is possible to accomplish the buckling deformation of the reinforcement 21 neatly, thereby taking effect similar to that of the first embodiment and the first modification.

(3rd. Modification)

Figure 18:
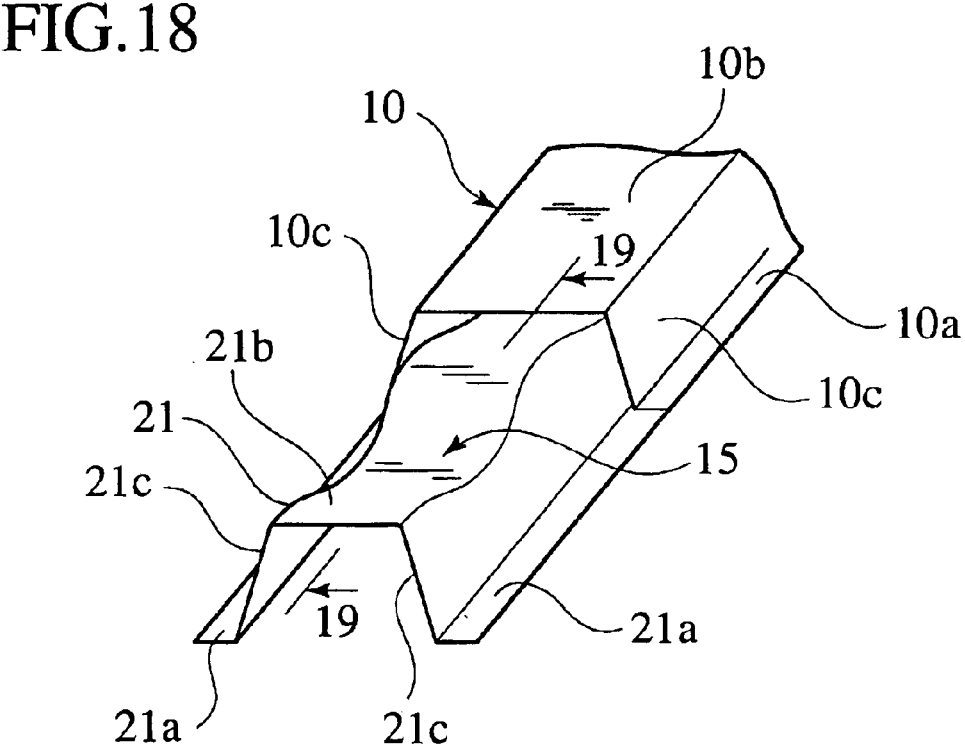
FIG. 18 is a perspective view similar to FIG. 5, explaining the structure of a cross member (part) of a third modification of the first embodiment of the invention.

FIG. 18 shows the third modification of the first embodiment. In the third modification, the top wall 21b of the reinforcement 21 is shaped just like a smooth wave succeeding in the longitudinal direction, providing the mechanism 15 for making the buckling-mode waveform of the reinforcement 21 a reversed phase of the buckling-mode waveform of the cross member 10.

Peaks and troughs forming the above wave of the top wall 21b are formed so as to oppose troughs and peaks in the buckling-mode waveform of the cross member 10, respectively.

Thus, according to the third modification, it is possible to neatly accomplish a bellows-shaped buckling deformation of the reinforcement 21 due to "peaks" and "troughs" in the waveform of the top wall 21b, allowing a deformation in the buckling-mode waveform SB having a reversed phase of the buckling-mode waveform SA of the cross member 10.

Throughout one embodiment and three modifications mentioned above, if making the inside reinforcement 14 (19, 21) equal to or different from the outside wall member 13 (18, 9, 10) in terms of its plate thickness and structure, it is possible to control timing of the beginnings of both buckling deformations each having a reversed phase to each other and also possible to control a contact force (resistance force) etc., easily.

(4th. Modification)

Figure 19:
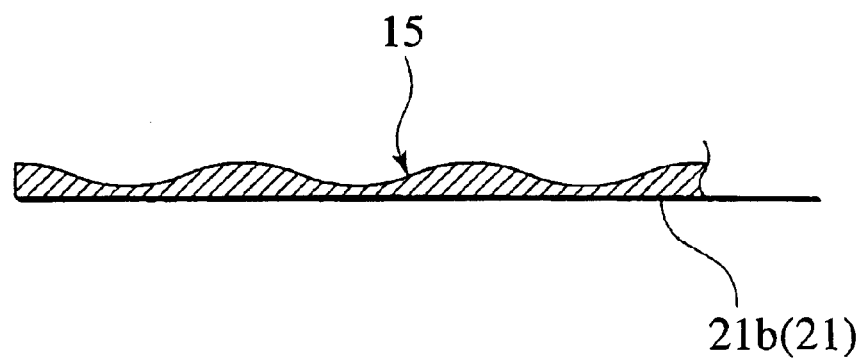
FIG. 19 is a view similar to a sectional view taken along a line 19—19 of FIG. 18, explaining the structure of a cross member (part) of a fourth modification of the first embodiment of the invention.

FIG. 19 shows the fourth modification similar to the third modification of the first embodiment. In the fourth modification, respective peak portions in the wave on the top wall 21b of the reinforcement 21 are formed as thick-walled parts each having a large thickness, while trough portions are formed as thin-walled parts each having a small thickness. The thick-walled parts and the thin-walled parts are arranged alternately in the longitudinal direction of the reinforcement 21.

According to the fourth modification mentioned above, since the bellows-shaped buckling deformation of the reinforcement 21 is induced at respective troughs of the thin-walled parts as the starting points of deformation, it is possible to perform the deformation in the buckling-mode waveform SB more neatly. Further, since the thick-walled peak portions of the reinforcement 21 come into intensive contact with respective "trough" portions in the buckling-waveform of the outside wall member (i.e. the cross member 10), it is possible to enhance a resistance force of the whole assembly of the cross member 10 and the reinforcement 21.

Further, in common with the first embodiment (incl. four modifications), since the reinforcement (14, 19, 22) is provided with the mechanism 15 for making one buckling-mode waveform a reversed phase of the other buckling-mode waveform, there is no possibility of affecting the outer appearance of the assembly of two wall members.

2nd. Embodiment

FIGS. 20 to 25 show the second embodiment where the reinforcing structure of the present invention is applied to the side member extension (or extension side member) 9 extending on each side of the vehicle.

Figure 20:
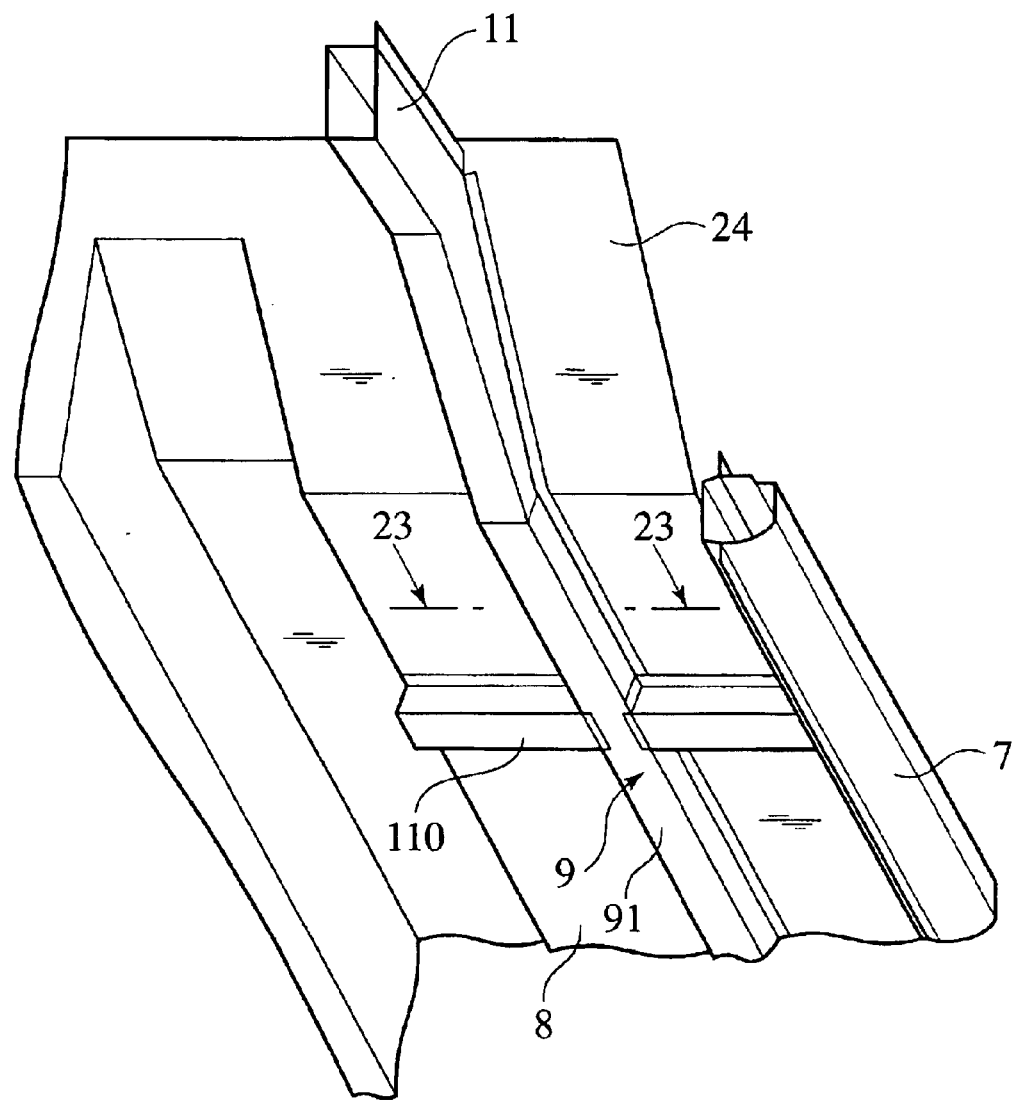
FIG. 20 is a perspective view of a side member extension in accordance with a second embodiment of the invention, viewed from the underside of the vehicle floor.

FIG. 20 is a perspective view of the arrangement of the side member extension 9, also viewed from the underside of the vehicle floor.

The front side member 11 has its rear end abutting against and joined to an inclined toe-board face of a dash panel 24 separating the front compartment FC (FIG. 1) from the cabin C.

The side member extension 9 is connected with the rear end of the front side member 11 to extend from the inclined face of the dash panel 24 along the underface of the floor panel 8 in the fore-and-aft direction of the vehicle. The rear end of the side member extension 9 is arranged to abut against a rear sheet cross member 100 (FIG. 24) welded to the underface of the floor panel 8 in the width direction of the vehicle. The rear end of the side member extension 9 is joined to the rear sheet cross member 100.

At the center part of the floor panel 8, the side member extension 9 also intersects with a floor cross member 110 welded to the underface of the floor panel 8 in the width direction of the vehicle.

The side member extension 9 includes an outer member 91 forming a hollow (closed) section together with the panels 24, 8 thereby forming a shell of the side member extension 9 and a reinforcement 92 arranged in the outer member 91 to extend in the longitudinal direction of the outer member 91.

The outer member 91 is formed to have a substantial hat-shaped section. The front end of the outer member 91 is fitted to the rear end of the front side member 11 from its outside. The outer member 91 is welded to the inclined face of the dash panel 24 and the underface of the floor panel 8 through flanges 91a.

Figure 21:
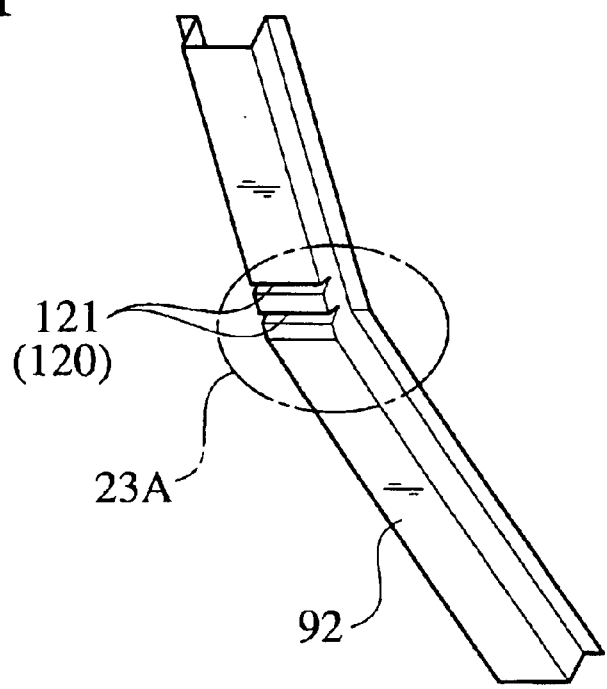
FIG. 21 is a perspective view of a reinforcement of the side member extension of FIG. 20.
Figure 22:
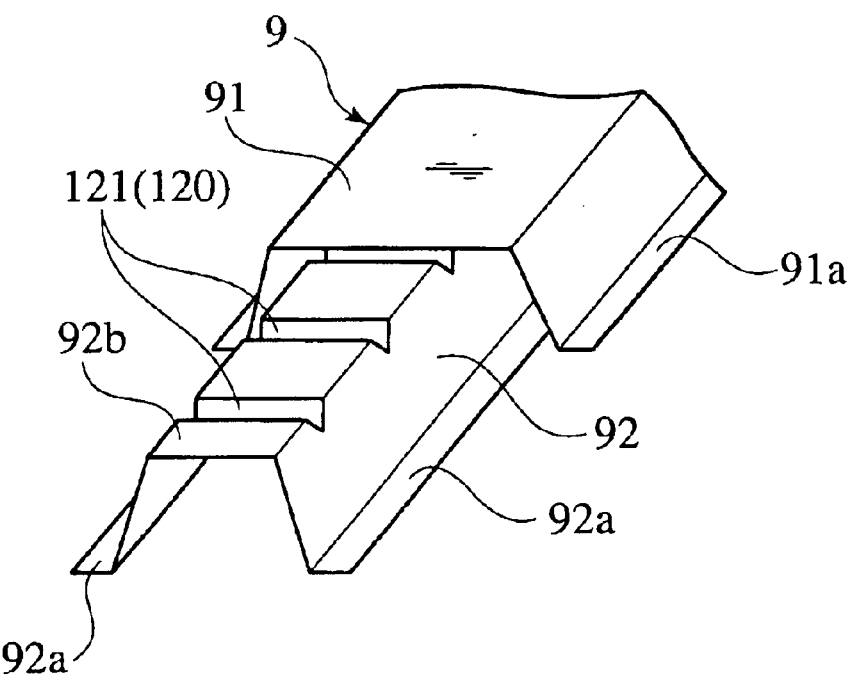
FIG. 22 is an enlarged perspective view of a circle area shown with 23A of FIG. 21.
Figure 23:
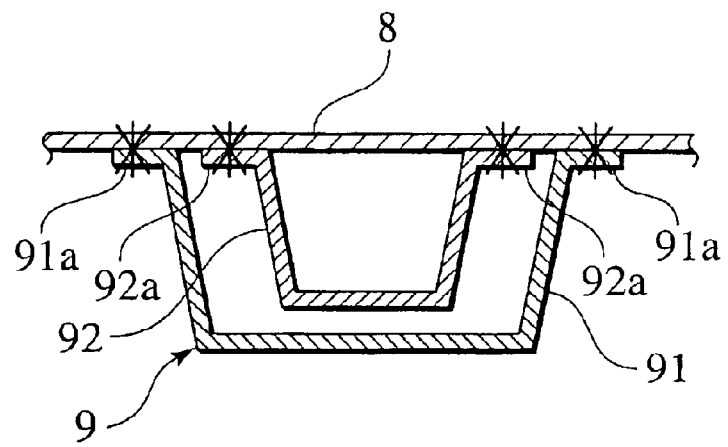
FIG. 23 is a sectional view taken along a line 23—23 of FIG. 20.

The reinforcement 92 is formed to have a substantial hat-shaped section smaller than that of the outer member 91, as shown in FIGS. 21 to 23. Independently of the outer member 91, the reinforcement 92 is welded to the panels 24, 8 through flanges 92a, forming a hollow (closed) section together with the panels 24, 8.

According to the embodiment, it is established that an amplitude of a "buckling-mode" waveform of the reinforcement 92 becomes smaller than an amplitude of a "buckling-mode" waveform of the outer member 91.

Figure 26:
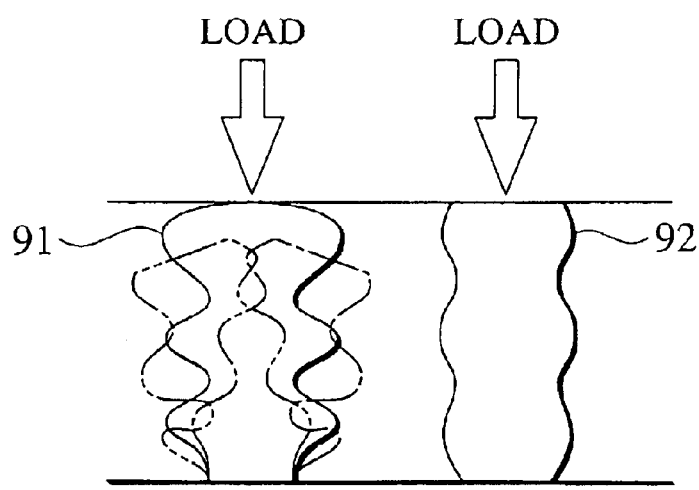
FIG. 26 is a view explaining the buckling models of an outer member having a large amplitude of deformation and a reinforcement having a small amplitude of deformation.

As shown in FIG. 26, if the reinforcement 92 having a small deformation amplitude and the outer member 91 having a large deformation amplitude are subjected to buckling at the same strokes, the outer member 91 becomes easier to be collapsed (folded) than the reinforcement 92, due to rapid progress in buckling deformation of the member 91.

Therefore, by combining the outer member 91 with the reinforcement 92, it allows the collapse (folding) of the outer member 91 to be restricted, whereby a stable buckling-mode can be expected for the side member extension 9.

Figure 27:
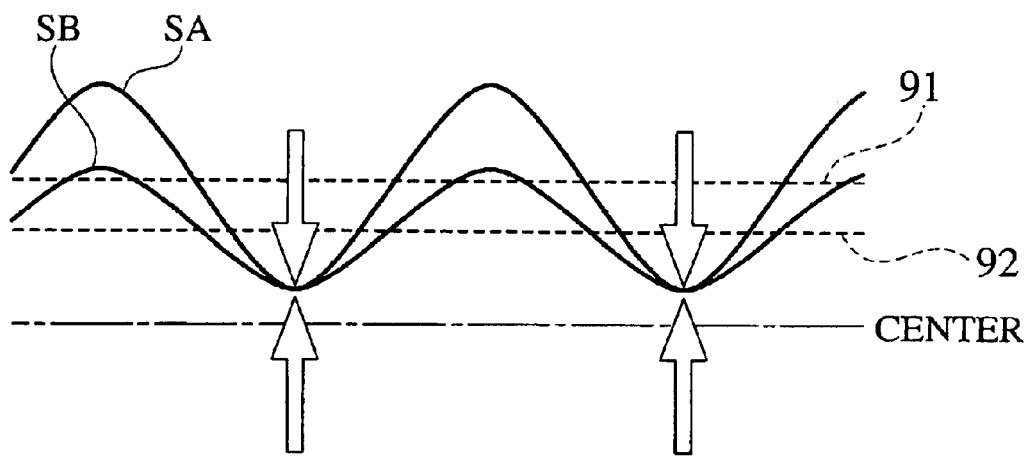
FIG. 27 is an explanatory view showing combined buckling-mode waveforms of the outer member and the reinforcement of FIG. 26.
Figure 28:
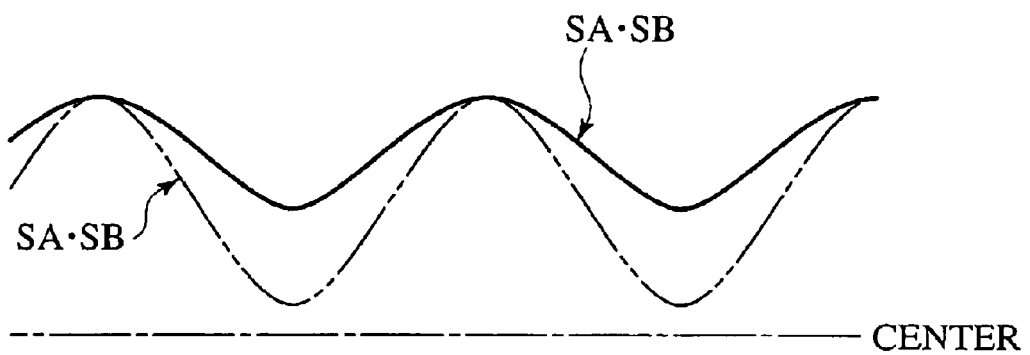
FIG. 28 is an explanatory view showing a composed buckling-mode waveform of the waveforms of FIG. 27.

In detail, as shown in FIG. 27, if the buckling-mode waveform SA of the outer member 91 having a large amplitude is combined with the buckling-mode waveform SB of the reinforcement 92 having a small amplitude, the waveforms SA and SB interference with each other at each node, so that a resultant (composite) waveform of the waveforms SA and SB, namely, a buckling-mode waveform of the whole side member extension 9 is modified to reduce its amplitude, as shown with a solid line of FIG. 28. Noted that a broken line of FIG. 28 denotes a resultant waveform in case of the waveforms SA and SB of the same amplitude.

According to the embodiment, the reinforcement 92 is provided with a buckling delay mechanism 120 which delays a time of starting the buckling of the reinforcement 92 against a time of starting the buckling of the outer member 91 in order to make the amplitude of the buckling-mode waveform of the reinforcement 92 smaller than the amplitude of the buckling-mode waveform of the outer member 91.

As shown in FIGS. 21 and 22, the buckling delay mechanism 120 is formed by a plurality of folding-inducing beads 121 of the reinforcement 92, as weakened parts. On a top wall 92b of the reinforcement 92, these beads 121 are formed in the vicinity of a bending base A of the reinforcement's front part which is bent along the inclined face of the dash panel 24.

Figure 24:
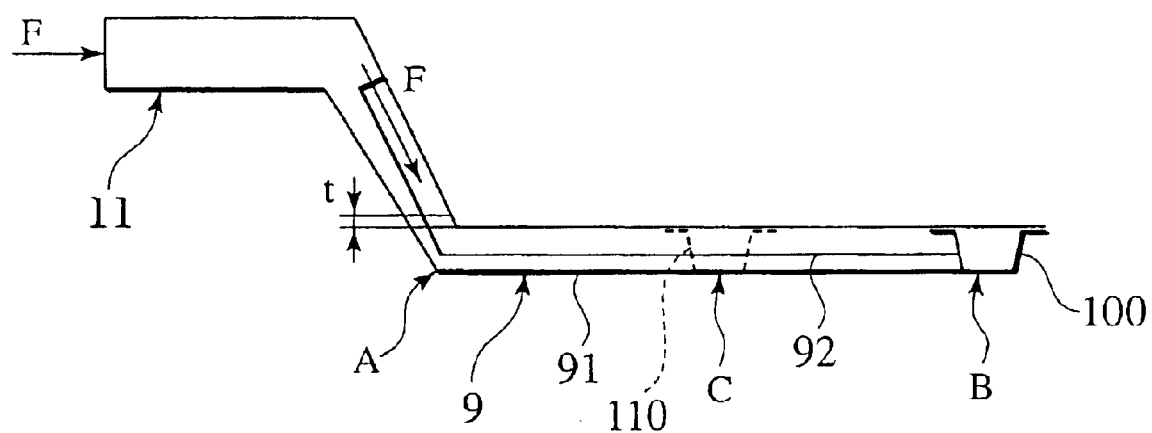
FIG. 24 is a side view showing the arrangement of the side member extension of FIG. 20 schematically.
Figure 25:
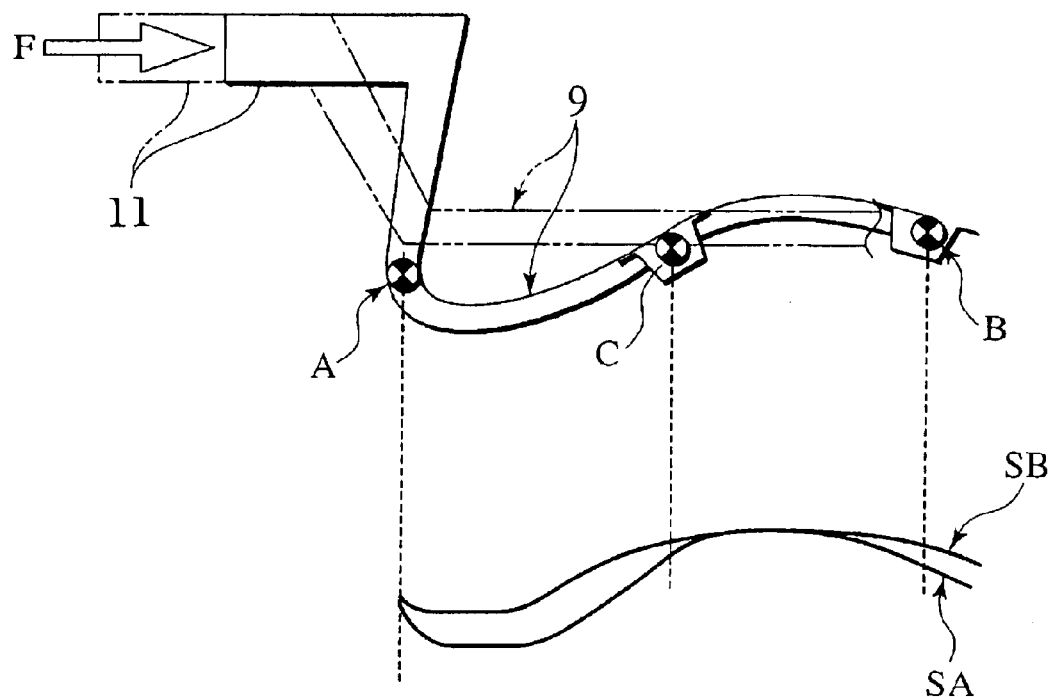
FIG. 25 is a side view showing the operation of the side member extension of FIG. 20 and its buckling-mode waveform, similar to FIG. 24.

FIGS. 24 and 25 illustrate the operation of the side member extension 9 when it is subjected to an external force (collision load) F by a vehicle front collision.

When the collision load F is exerted to the front end of the front side member 11 due to the vehicle collision, the collision load F is transmitted to the side member extension 9 in the axial direction.

In process of transmitting the collision load F to a reaction-force bearing point B where the side member extension 9 abuts against the rear sheet cross member 100, the reinforcement 92 is folded with the beads 121 as the starting point of deformation. That is, the collision load is transmitted to the reaction-force bearing point B through the reinforcement 92 after a delay of time t since the collision load has been transmitted to the same point B through the outer member 91.

Therefore, the progress of amplitude of the buckling-mode waveform SB of the reinforcement 92 is restricted, so that an amplitude of the buckling-mode waveform SB of the reinforcement 92 becomes smaller than an amplitude of the buckling-mode waveform SA of the outer member 91, as shown in FIG. 27.

While, due to the axial input of the collision load F on the front end of the front side member 11, the front end of the side member extension 9 has a tendency to be collapsed backward with the base point A as a bearing point, as shown in FIG. 25. Below the vehicle floor and between the base point A and the reaction-force bearing point B, the side member extension 9 is buckled in a substantial S-shaped manner in side view, with these points A, B and also a joint point C with the floor cross member 110 as respective bearing points.

Then, since it is established by the buckling delay mechanism 120 that the amplitude of the buckling-mode waveform of the reinforcement 92 becomes smaller than the amplitude of the buckling-mode waveform of the outer member 91, there is produced, between the point B and the point C, an interference of respective nodes of the buckling-mode waveforms SA and SB, so that the upward deformation of the outer member 91 is restricted by its interference with the reinforcement 92.

According to the embodiment, owing to a resistance force produced by the mutual interference between the outer member 91 and the reinforcement 92, it is possible to allow them to share the collision load thereby dispersing the deformation to the whole side member extension 9 while restricting the growth of a local deformation between the point B and the point C, whereby a reaction force against collapse can be enhanced to increase the energy consumption of the reinforcing structure.

Accordingly, without increasing the sizes of the outer member 91 and the reinforcement 92 or adding a reinforcement member, the reinforcing effect in the side member extension 9 is enhanced to improve the performance against the collision.

Additionally, since the upward deformation of the side member extension 9 is restricted between the point B and the point C, it is possible to maintain high rigidity of a seat attachment established in the same area, whereby the stability of a seat can be enhanced.

Again noted, according to the second embodiment, the buckling delay mechanism 120 which delays a time of starting the buckling of the reinforcement 92 for a predetermined period (t) against a time of starting the buckling of the outer member 91 allows the amplitude of the buckling-mode waveform of the reinforcement 92 to be smaller than the amplitude of the buckling-mode waveform of the outer member 91. Therefore, owing to the provision of a weakened part, for example, the folding-inducing beads 121 in this case, at a predetermined position of the reinforcement 92, it is possible to enhance the reinforcing effect of the side member extension 9.

(1st. Modification)

Figure 29:
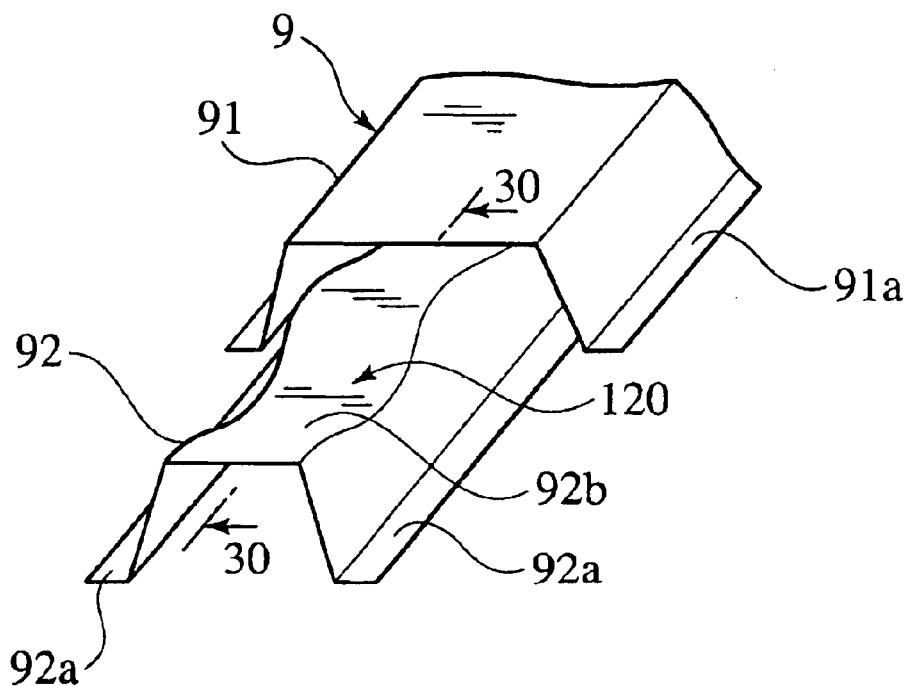
FIG. 29 is a perspective view showing a first modification of the second embodiment, similar to FIG. 22.

FIG. 29 shows the first modification of the second embodiment. In this modification, the top wall 92b of the reinforcement 92 is shaped just like a smooth wave succeeding in the longitudinal direction, providing the buckling delay mechanism 120.

In operation, on receipt of an external force due to a collision etc., the reinforcement 92 is folded with respective troughs in the above wave on the top wall 92b as the starting point of deformation. Consequently, as similar to the second embodiment mentioned above, the time of starting the buckling of the reinforcement 92 is delayed for a predetermined period (t) in comparison with the time of starting the buckling of the outer member 91. Further, different from the folding-inducing beads 121, it is possible to prevent an occurrence of cracks in the reinforcement 92 due to concentration of local stress thereon, ensuring the reinforcing effect of the reinforcement 92 itself.

(2nd. Modification)

Figure 30:
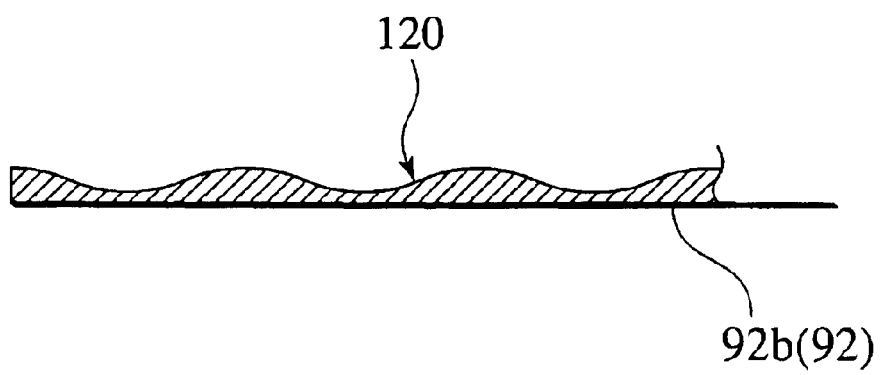
FIG. 30 is a view similar to a sectional view taken along a line 30—30 of FIG. 29, showing a second modification of the second embodiment of the invention.

FIG. 30 shows the second modification of the second embodiment. In the second modification, respective peak portions in the wave on the top wall 92b of the reinforcement 92 are formed as thick-walled parts each having a large thickness, while trough portions are formed as thin-walled parts each having a small thickness. The thick-walled parts and the thin-walled parts are arranged alternately in the longitudinal direction of the reinforcement 92, providing the buckling delay mechanism 120.

According to the second modification, by the input of an external load in the axial direction of the side member extension 9, the reinforcement 92 is folded at respective troughs of the thin-walled parts as the starting points of deformation. Consequently, as similar to the second embodiment mentioned above, the time of starting the buckling of the reinforcement 92 is delayed in comparison with the time of starting the buckling of the outer member 91. In process of the progress of folding, the intensive contact of respective "peaks" of the thick-walled parts of the reinforcement 92 with the outer member 91 allows a resistance force (contact force) to be enhanced.

(3rd. Modification)

Figure 31:
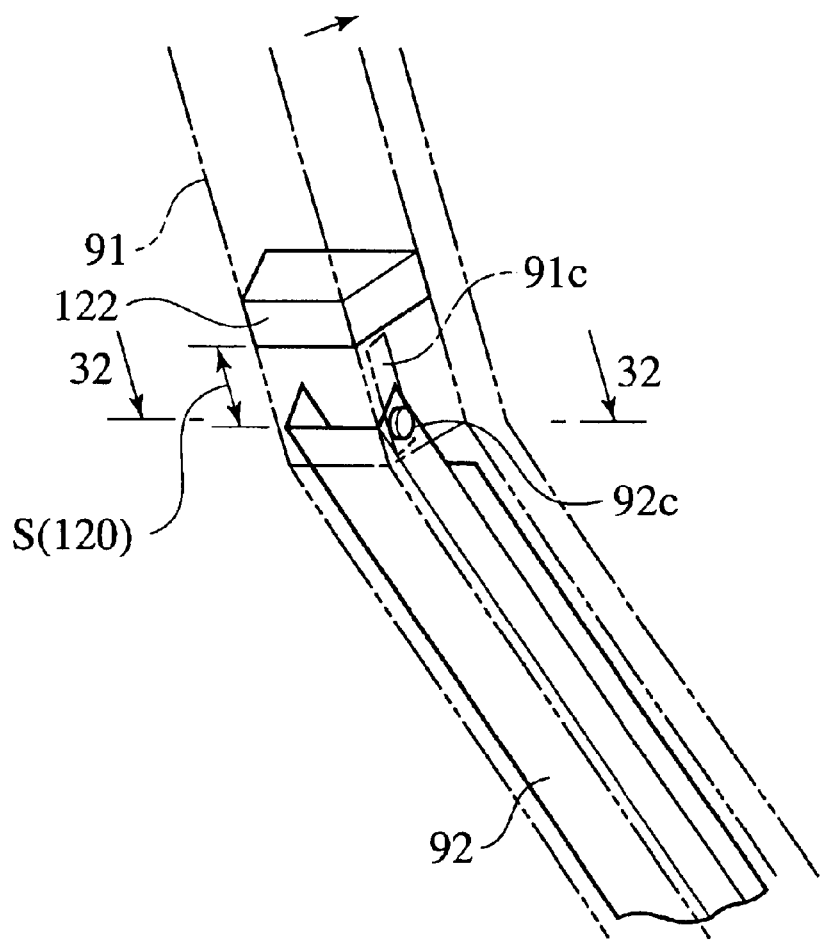
FIG. 31 is a perspective view showing a third modification of the second embodiment.
Figure 32:
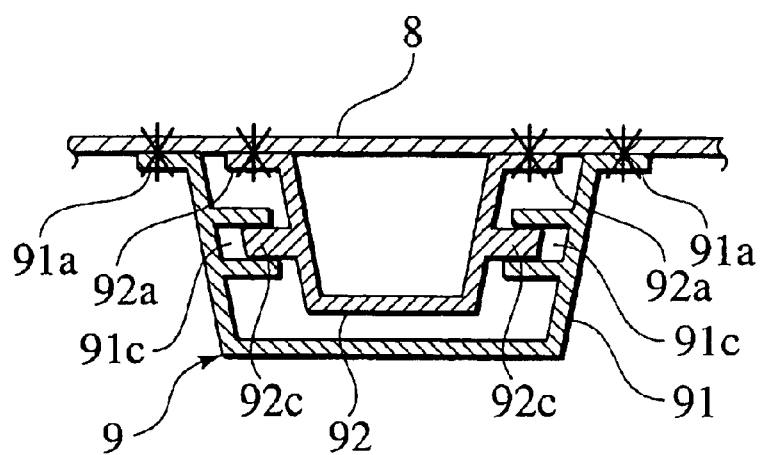
FIG. 32 is a sectional view taken along a line 32—32 of FIG. 31.

FIGS. 31 and 32 show the third modification of the second embodiment. In the third modification, the position of a front end of the side member extension 9 is established to be in the vicinity of the above point A (see FIG. 25). Further, the buckling delay mechanism 120 is formed by a clearance S defined between the front end of the reinforcement 92 and the outer member 91, in the direction of a load being inputted (i.e. axial direction).

In the closed section of the outer member 91, a bulkhead 122 is fixed to the outer member 91 so as to oppose the front end of the reinforcement 92 through the above clearance S. In operation, when the outer member 91 is buckled in the axial direction with a displacement of the clearance S, the bulkhead 122 comes into pressure contact with the front end of the reinforcement 92, thereby transmitting an axial load in the axial direction to it.

The outer member 91 has guide grooves 91c formed inside respective sidewalls of the member 91, while the reinforcement 92 has guide pins 92c formed to project from respective sidewalls of the reinforcement 92, for engagement with the guide grooves 91c. The guide grooves 91c and the guide pins 92c allow of a suitable contact between the bulkhead 122 and the front end of the reinforcement 92.

Accordingly, when a collision load F of a front collision is transmitted to the outer member 91 of the side member extension 9 through the front side member 11 immediately and when the outer member 91 is deformed in the axial direction by the clearance S, the bulkhead 122 comes into pressure contact with the front end of the reinforcement 92 thereby transmitting the axial load to the reinforcement 92.

That is, the axial load is transmitted to the reinforcement 92 with a delay of a predetermined period (t) required for the outer member 91 to be deformed by the clearance S. In this way, it is possible to restrict the growth of an amplitude of the buckling-mode waveform of the reinforcement 92 against the outer member 91, whereby the small amplitude of the deformation of the reinforcement 92 can be realized to take the similar effect to the second embodiment mentioned before.

Especially, with the adoption of the clearance S as the buckling delay mechanism 120, the timing of transmitting a load could be controlled easily by suitable establishment of the clearance S.

(4th. Modification)

Figure 33:
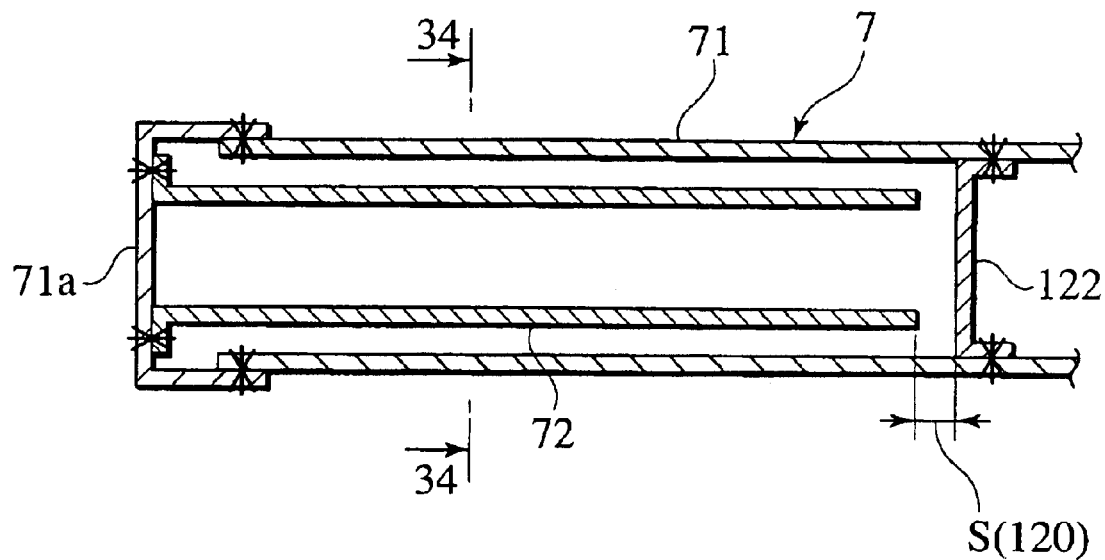
FIG. 33 is a perspective view showing a fourth modification of the second embodiment.
Figure 34:
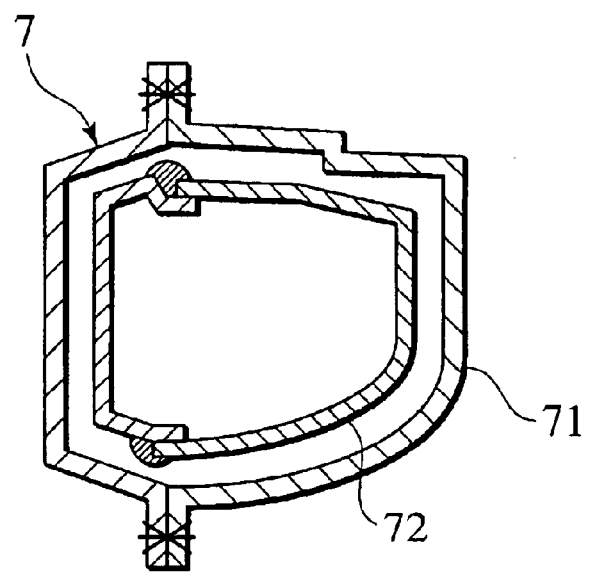
FIG. 34 is a sectional view taken along a line 34—34 of FIG. 33.

FIGS. 33 and 34 show the fourth modification of the second embodiment. In this modification, the buckling delay mechanism 120 in the third modification position is embodied in the side sill 7.

The side sill 7 includes an outer member 71 having a hollow (closed) section to form a shell of the side sill 7 and a reinforcement 72 arranged in the outer member 71 to extend in the longitudinal direction of the outer member 71.

As shown in FIG. 33, the reinforcement 72 has its front end welded to an end plate 71a for closing the front end of the outer member 71. Inside the outer member 71, the bulkhead 122 for clogging its closed section is arranged and welded to the inner wall of the member 71 so as to leave a clearance S against the rear end of the reinforcement 72, providing the buckling delay mechanism 120.

In operation, the outer member 71 begins to be deformed in the axial direction as soon as a collision load F has been exerted to the front end of the outer member 71 by a vehicle front collision. When the outer member 71 is deformed by the clearance S, the rear end of the reinforcement 72 comes into pressure contact with the bulkhead 122. Thus, the axial load is transmitted to the reinforcement 72 with a delay of a predetermined period (t), thereby starting the axial buckling of the reinforcement 72.

In this way, it is possible to restrict the growth of an amplitude of the buckling-mode waveform of the reinforcement 72 against the outer member 71, whereby the small amplitude of the deformation of the reinforcement 72 can be realized to obtain the waveform characteristics similar to those of FIGS. 27 and 28.

As a result, there is produced interference of nodes in the buckling-waveforms between the outer member 71 and the reinforcement 72 throughout the side sill 7, so that the growth of local deformation of the outer member 71 is restricted to avoid the folding of the side sill 7. Additionally, a resistance force is increased by the mutual interference between the outer member 71 and the reinforcement 72 thereby enhancing a reaction force against collapse.

(5th. Modification)

Figure 35:
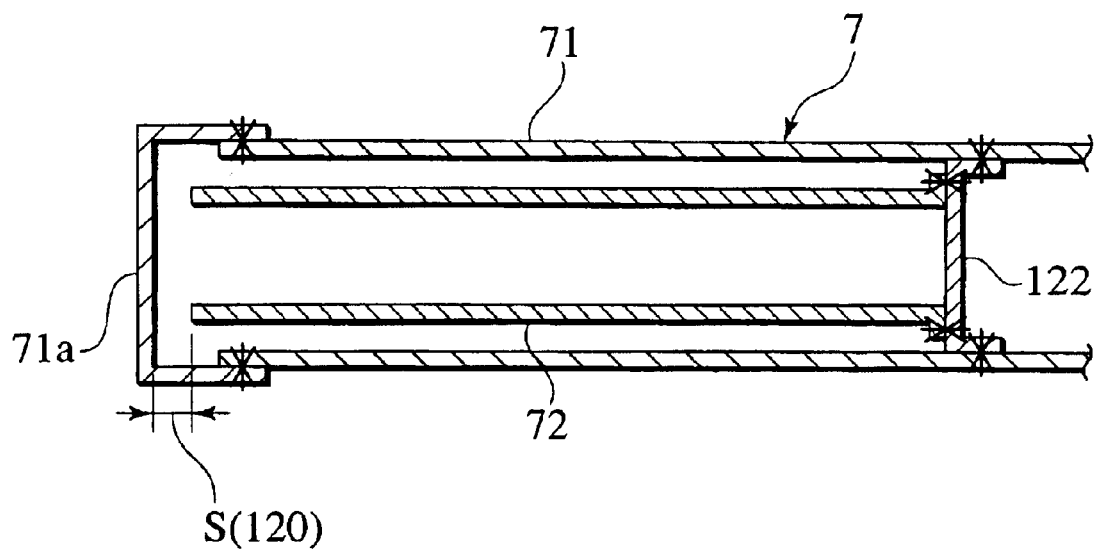
FIG. 35 is a sectional view similar to FIG. 33, showing a fifth modification of the second embodiment.

In the above-mentioned fourth modification of the second embodiment, the clearance S is defined between the rear end of the reinforcement 72 and the bulkhead 122. FIG. 35 shows one modification of the fourth modification, providing the fifth modification of the second embodiment.

According to this modification, the reinforcement 72 has its rear end welded to the bulkhead 122 so as to define a clearance S between the end plate 71a and the front end of the reinforcement 72, providing the buckling delay mechanism 120.

The operation and effects of the above arrangement are similar to those of the fourth modification of the second embodiment.

(6th. Modification)

Figure 36:
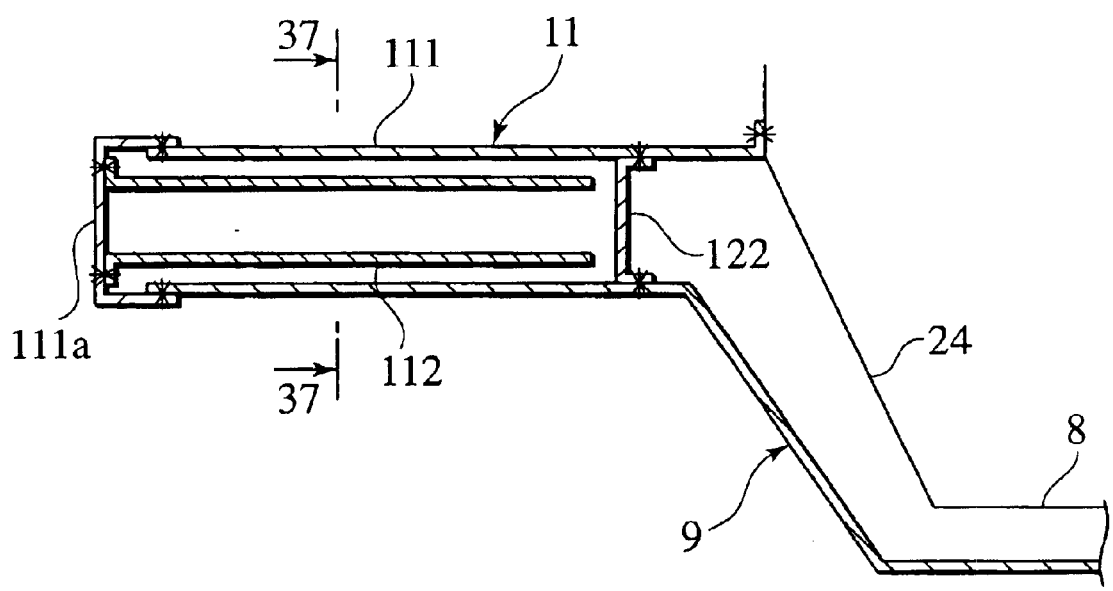
FIG. 36 is a sectional view showing a sixth modification of the second embodiment.
Figure 37:
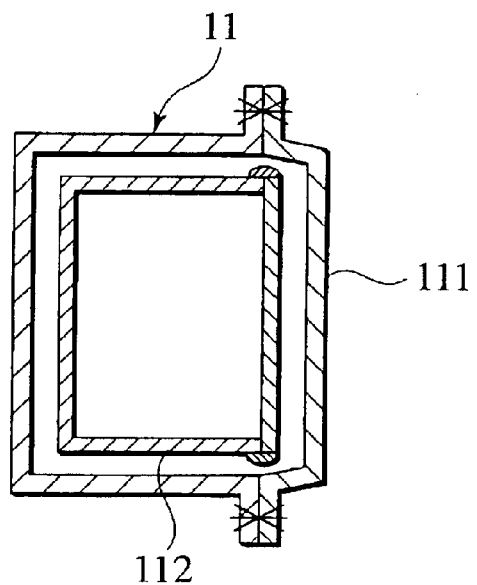
FIG. 37 is a sectional view taken along a line 37—37 of FIG. 36.

FIGS. 36 and 37 show the sixth modification of the second embodiment. In this modification, the buckling delay mechanism 120 in the fourth modification position is embodied in the front side member 11.

The front side member 11 includes an outer member 111 having a hollow (closed) section and a reinforcement 112 arranged in the outer member 111 to extend in the longitudinal direction of the outer member 111.

The reinforcement 112 has its front end welded to an end plate 111a for closing the front end of the outer member 111. Inside the outer member 111, the bulkhead 122 is arranged and welded to the inner wall of the member 111 so as to leave a clearance S against the rear end of the reinforcement 112, providing the buckling delay mechanism 120.

The operation and effects of the above arrangement are similar to those of the fourth modification and the fifth modification relating to the side sill 7.

(7th. Modification)

Figure 38:
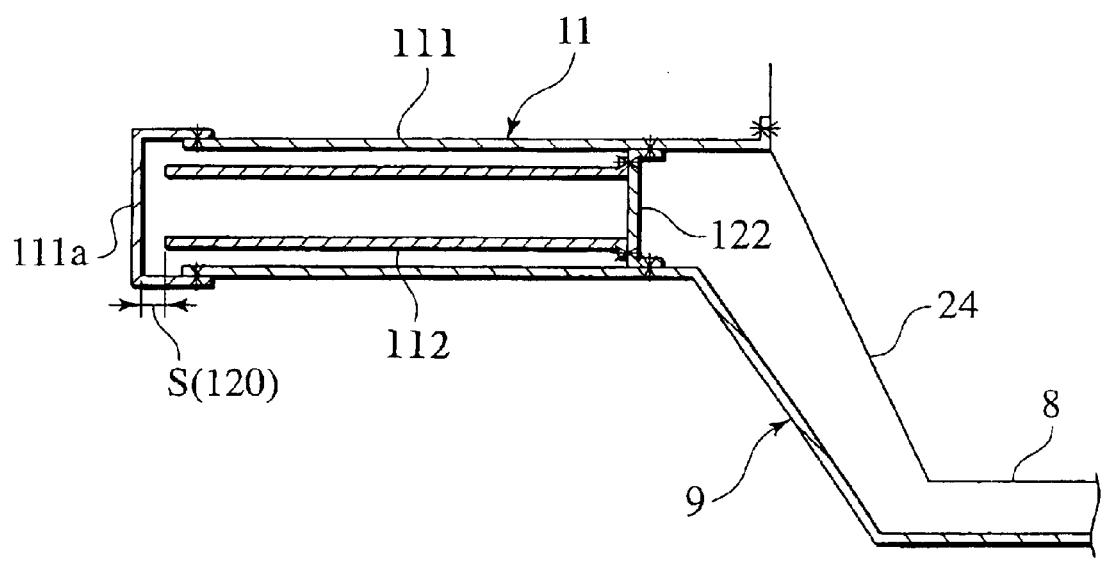
FIG. 38 is a sectional view similar to FIG. 36, showing a seventh modification of the second embodiment.

In one modification of the sixth modification, FIG. 38 shows the seventh modification of the second embodiment.

According to this modification, the reinforcement 112 has its rear end welded to the bulkhead 122 so as to define a clearance S between the end plate 111a and the front end of the reinforcement 112, providing the buckling delay mechanism 120.

The operation and effects of the above arrangement are similar to those of the fourth modification of the second embodiment.

(8th. Modification)

Figure 39:
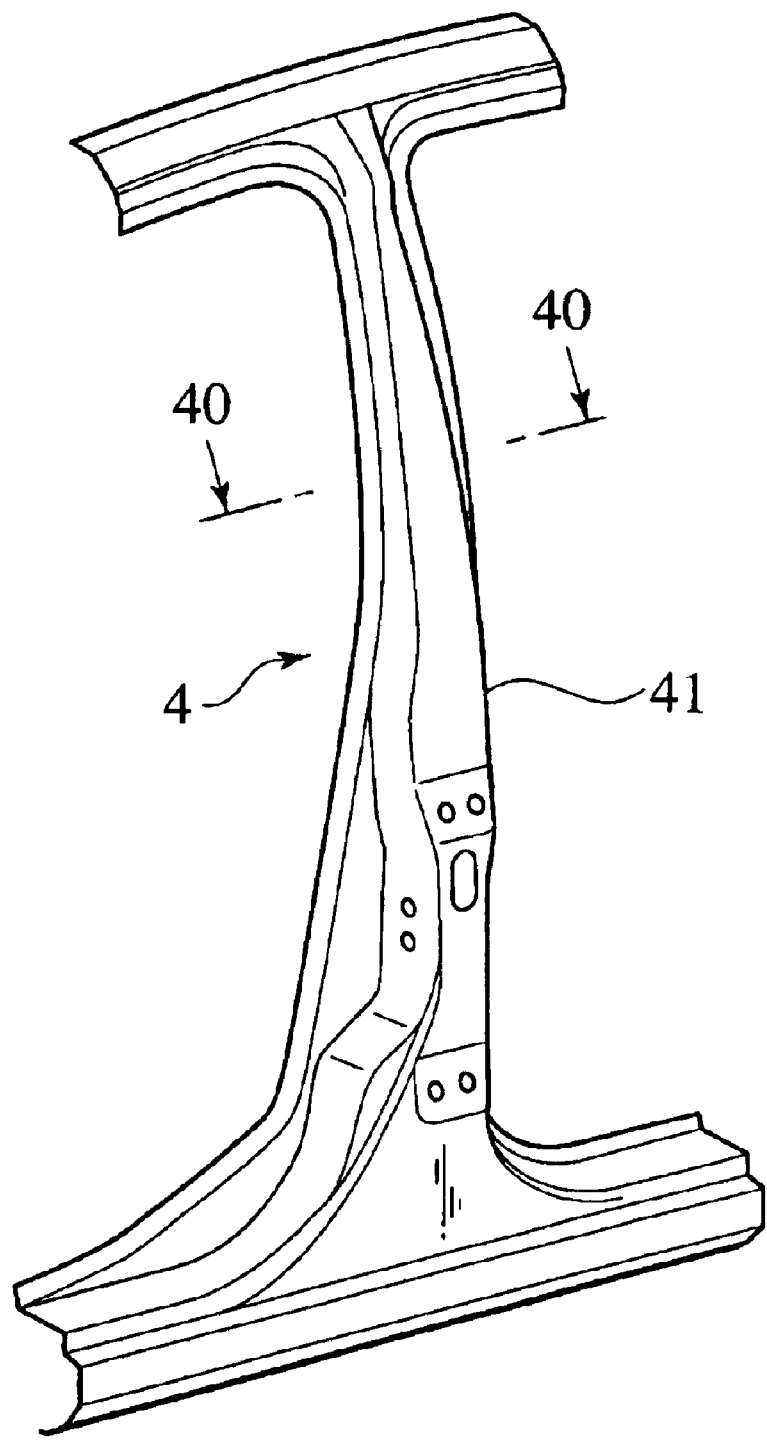
FIG. 39 is a perspective view of a center pillar showing an eighth modification of the second embodiment.
Figure 40:
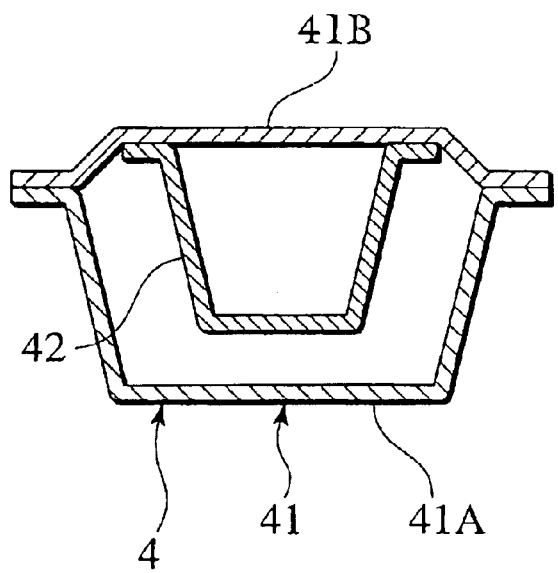
FIG. 40 is a sectional view taken along a line 40—40 of FIG. 39.
Figure 41:
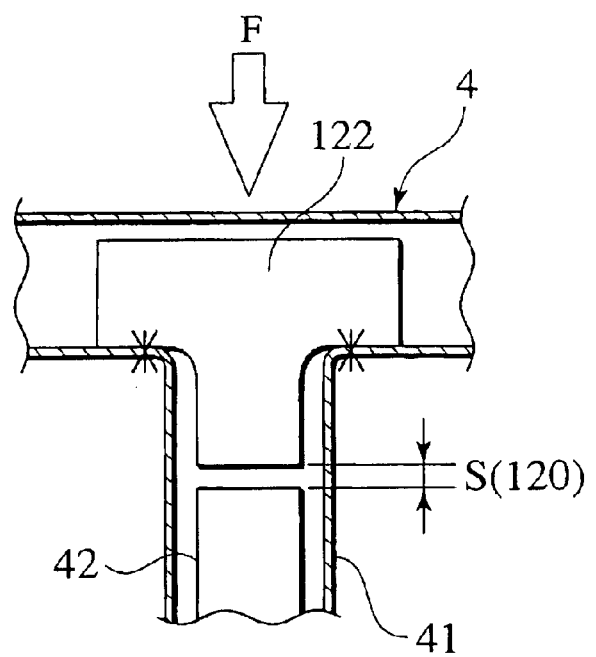
FIG. 41 is a side view showing a section of an essential part of the eighth modification of the second embodiment.

FIGS. 39 to 41 show the eighth modification where the buckling delay mechanism 120 in the fourth modification is applied to the center pillar 4.

The center pillar 4 includes an outer member 41 having a hollow (closed) section to form a shell of the pillar 4 and a reinforcement 42 arranged in the outer member 41 to extend in the longitudinal direction of the outer member 41. The outer member 41 is formed by an outer panel 41A and an inner panel 41B, providing the closed section. The reinforcement 42 is formed to have a substantial hat-shaped section smaller than that of the outer panel 41A and welded to the inner panel 41B independently of the outer panel 41A to form a closed section.

It is established that a top end of the reinforcement 42 is lower than the top end of the outer member 41. The bulkhead 122 is accommodated in the upper end of the outer member 41. The bulkhead 122 is secured to the outer member 41 to transmit a collision load F from its upside to the reinforcement 42.

Provided between the lower end of the bulkhead 122 and the upper end of the reinforcement 42 is a clearance S which forms the buckling delay mechanism 120 in this modification.

In operation, the outer member 41 begins to be deformed in the axial direction as soon as a collision load F (see FIG. 41) has been exerted to the front end of the outer member 41 from its upside. When the outer member 41 is deformed by the clearance S, the lower end of the bulkhead 122 comes into pressure contact with the top of the reinforcement 42. Thus, the axial load is transmitted to the reinforcement 42 with a delay of a predetermined period (t), thereby starting the axial buckling of the reinforcement 42.

In this way, it is possible to restrict the growth of an amplitude of the buckling-mode waveform of the reinforcement 42 against the outer member 41, whereby the small amplitude of the deformation of the reinforcement 42 can be realized to obtain the waveform characteristics similar to those of FIGS. 27 and 28.

As a result, there is produced interference of nodes in the buckling-waveforms between the outer member 41 and the reinforcement 42 throughout the center pillar 4, so that the growth of local deformation of the outer member 41 is restricted to avoid the folding of the center pillar 4. Additionally, a resistance force is increased by the mutual interference between the outer member 41 and the reinforcement 42 thereby enhancing a reaction force against collapse.
(9th. Modification)

FIGS. 42A and 42B show the ninth modification where the second embodiment is applied to the side member extension. This modification resembles the second embodiment of FIGS. 20 and 23 in that the side member extension is formed by the outer member 91 and the reinforcement 92.

According to this modification, the reinforcement 92 is provided with a buckling restricting mechanism 130 which serves to restrict the buckling deformation of the reinforcement 92 in order to make an amplitude of the buckling-mode waveform of the reinforcement 92 smaller than an amplitude of the buckling-mode waveform of the outer member 91.

As shown in FIG. 42B, the buckling restricting mechanism 130 is formed by a plurality of axial beads 131 on the top wall 92B of the reinforcement 92. These axial beads 131 are formed over the whole length of a horizontal part of the reinforcement 92 along a vehicle floor face, at regular intervals in the longitudinal direction.

As shown in FIG. 42A, when the horizontal part of the outer member 91 along the vehicle floor face has an axial buckling-mode waveform SA established at a required "waveform" pitch in the longitudinal direction of the member 91 while setting the front end of the horizontal part as a node of waveform, the axial beads 131 are formed in respective areas corresponding to respective antinodes of the buckling-mode waveform SA of the outer member 91, with a predetermined length L each.

Further, the reinforcement 92 is provided, on the top wall 92b, with a plurality of lateral beads 132 each of which is interposed between the adjoining axial beads 131, 131 to extend in a direction perpendicular to the axial bead 131. In other words, each lateral bead 132 is formed in a position corresponding to each node of the buckling-mode waveform SA of the outer member 91.

In operation, when an axial load is applied on the side member extension 9 by a vehicle front collision, the above horizontal part of the outer member 91 is buckled in a wavy manner with the buckling-mode waveform SA.

On the other hand, the horizontal part of the reinforcement 92 is also buckled, from its front end in the axial direction, in the form of a wave in substantial synchronization with the outer member 91 and also in the same pitch as the outer member's pitch. Nevertheless, in the reinforcement's portion corresponding to each antinode of the waveform of the outer member 91, curve-shaped buckling is restricted by the axial bead 131 on the top wall 92b. In the buckling-mode waveform SB of the whole reinforcement 92 in the longitudinal direction, as shown in FIG. 42B, the growth of an amplitude of the waveform is restricted to reduce an amplitude of deformation, thereby accomplishing the waveform characteristics similar to those of FIGS. 27 and 28.

As a result, there is produced interference of nodes in the buckling-waveforms between the outer member 91 and the reinforcement 92, so that the growth of local deformation of the outer member 91 is restricted to avoid the folding of the side member extension 9. Additionally, the mutual interference between the outer member 91 and the reinforcement 92 allows a resistance force to be increased to enhance a reaction force against collapse.

According to this modification, owing to the provision of the lateral beads 132 each interposed between the axial beads 131, 131 adjoining in front and behind, it is possible to accelerate the buckling of the reinforcement 92 at the lateral beads 132 as the starting points of deformation. Thus, it is possible to control the buckling of the reinforcement at the same "buckling" pitch as that of the outer member 91.
(10th., 11th., and 12th. Modifications)

Figure 44:
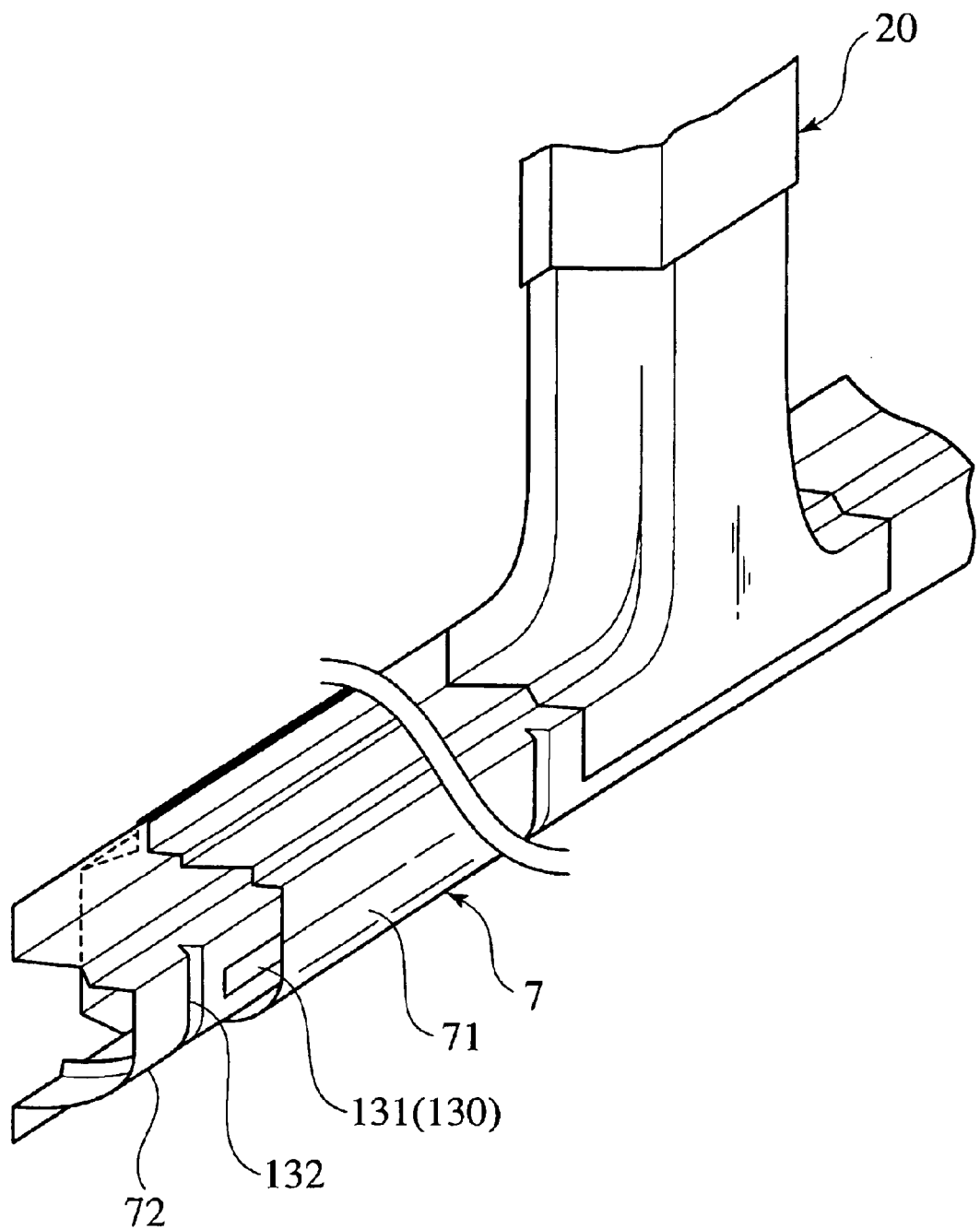
FIG. 44 is a perspective view showing an eleventh modification of the second embodiment.
Figure 45:
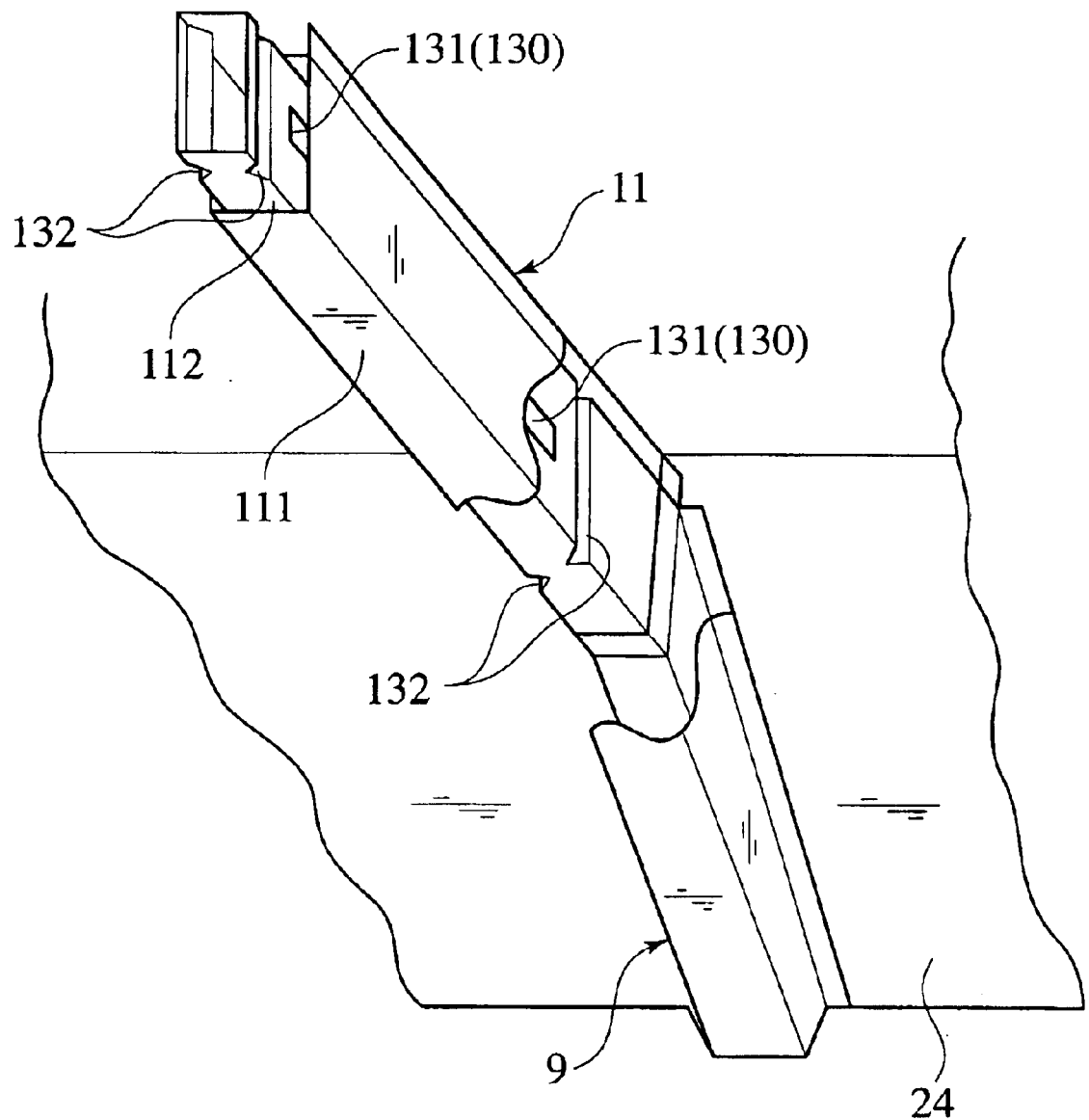
FIG. 45 is a perspective view showing a twelfth modification of the second embodiment.

In the previously-mentioned modification, the buckling restricting mechanism 130 is applied to the reinforcement 92 of the side member extension 9. In the modifications, the buckling restricting mechanism 130 is applicable to various framework members. FIG. 43 shows the tenth modification of the second embodiment where the buckling restricting mechanism 130 is applied to the reinforcement 42 of the center pillar 4. FIG. 44 shows the eleventh modification of the second embodiment where the buckling restricting mechanism 130 is applied to the reinforcement 72 of the side sill 7. FIG. 45 shows the twelfth modification of the second embodiment where the buckling restricting mechanism 130 is applied to the reinforcement 112 of the front side member 11.

The operation and effects of the above modifications are similar to those of the ninth modification of the second embodiment.

3rd. Embodiment

Figure 46:
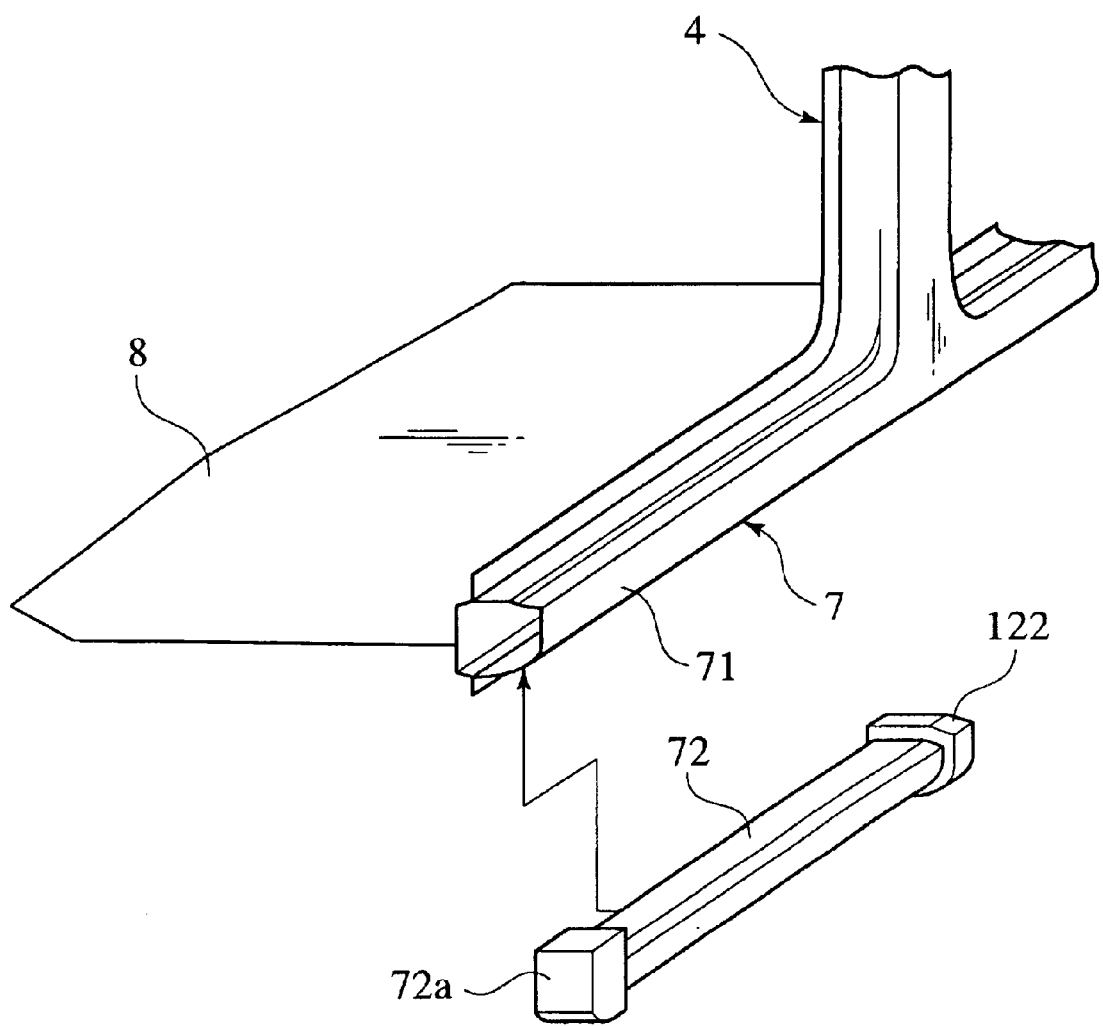
FIG. 46 is an exploded perspective view showing a side sill in accordance with a third embodiment of the invention.

FIGS. 46 to 51 show the third embodiment of the present invention. In this embodiment, the reinforcing structure of the invention is applied to the side sills on both sides of the vehicle. FIG. 46 is a perspective view of the side sill 7 on one side of the vehicle.

As mentioned before, the side sill 7 includes the outer member 71 having a hollow (closed) section to form a shell of the side sill 7 and the reinforcement 72 having a hollow (closed) section smaller than that of the outer member 71 and arranged in the outer member 71 to extend in the longitudinal direction of the outer member 71. The outer member 71 has its front end joined to the lower end of the front pillar 3 and the rear end joined to the lower end of the rear pillar 5.

Figure 49:
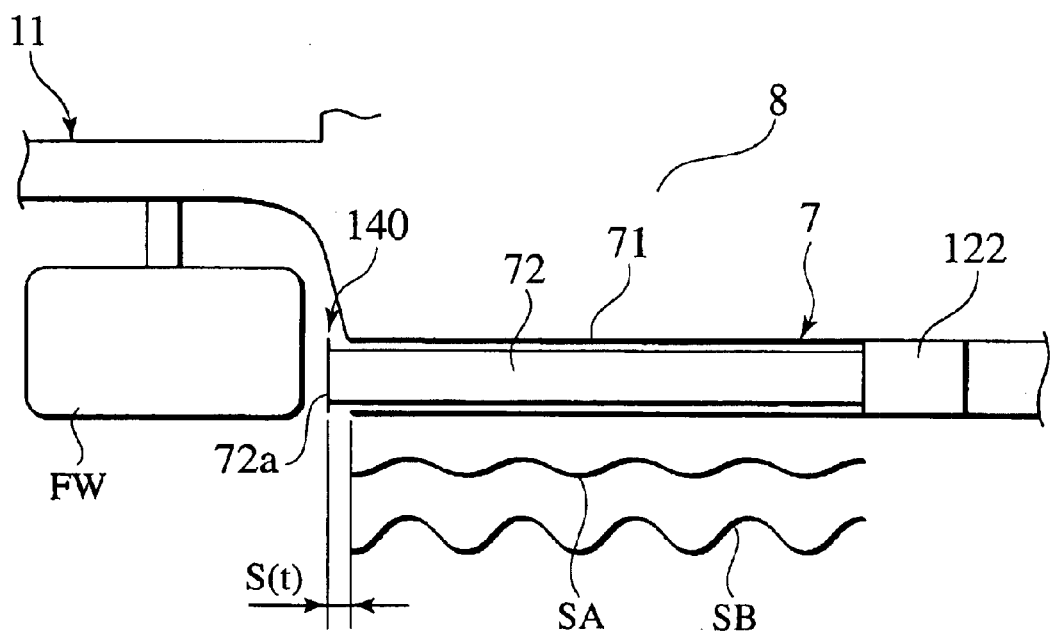
FIG. 49 is a plan view showing the arrangement of the side sill of FIG. 46 and its buckling-mode waveform schematically.

According to the third embodiment, as shown in FIG. 49, it is established that an amplitude of a "buckling-mode" waveform SB of the reinforcement 72 becomes larger than an amplitude of a "buckling-mode" waveform SA of the outer member 71.

Figure 52:
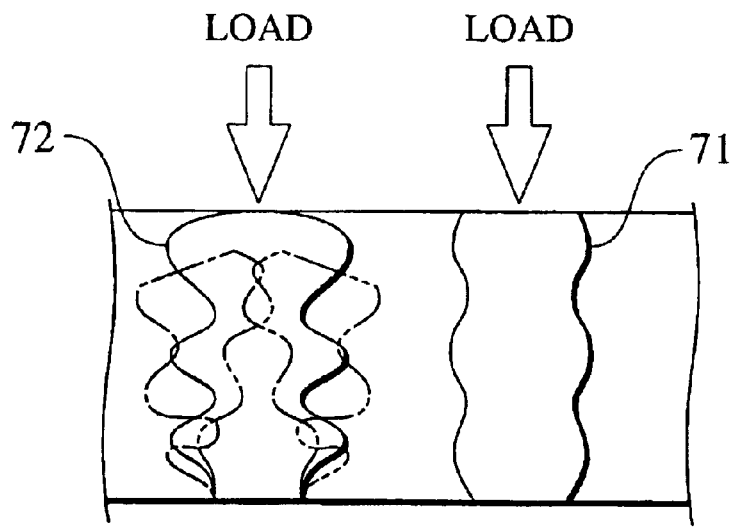
FIG. 52 is a view explaining the buckling models of an outer member having a large amplitude of deformation and a reinforcement having a small amplitude of deformation.

As shown in FIG. 52, if the reinforcement 72 having a large deformation amplitude and the outer member 71 having a small deformation amplitude are subjected to buckling at the same strokes, the reinforcement 72 becomes easier to be collapsed (folded) than the outer member 71, due to rapid progress in buckling deformation of the reinforcement 72.

Therefore, by combining the reinforcement 72 with the outer member 71, it allows the collapse (folding) of the reinforcement 72 to be restricted, whereby a stable buckling-mode can be expected for the side sill 7.

Figure 53:
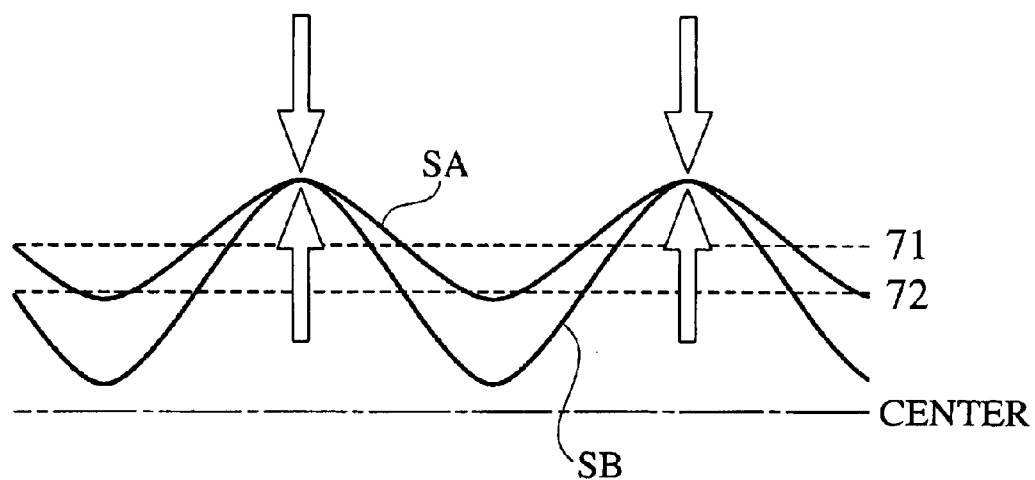
FIG. 53 is an explanatory view showing combined buckling-mode waveforms of the outer member and the reinforcement of FIG. 52.
Figure 54:
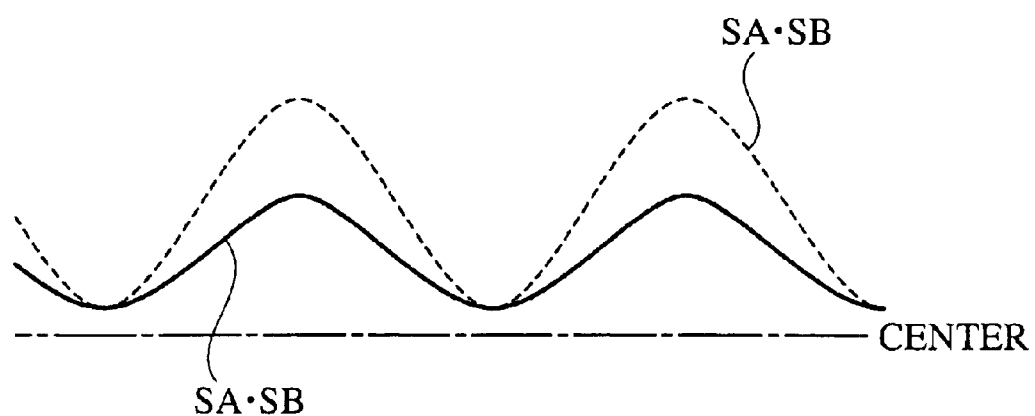
FIG. 54 is an explanatory view showing a composed buckling-mode waveform of the waveforms of FIG. 53.

In detail, as shown in FIG. 53, if the buckling-mode waveform SA of the outer member 71 having a small amplitude is combined with the buckling-mode waveform SB of the reinforcement 72 having a large amplitude, the waveforms SA and SB interference with each other at each antinode, so that a resultant (composite) waveform of the waveforms SA and SB, namely, a buckling-mode waveform of the whole side sill 7 is modified to reduce its amplitude, as shown with a solid line of FIG. 54. Noted that a broken line of FIG. 54 denotes a resultant waveform in case of the waveforms SA and SB of the same amplitude.

According to the embodiment, the reinforcement 72 is provided with a buckling accelerating mechanism 140 which accelerates a time of starting the buckling of the reinforcement 72 against a time of starting the buckling of the outer member 71 in order to make the amplitude of the buckling-mode waveform of the reinforcement 72 larger than the amplitude of the buckling-mode waveform of the outer member 71.

Figure 47:
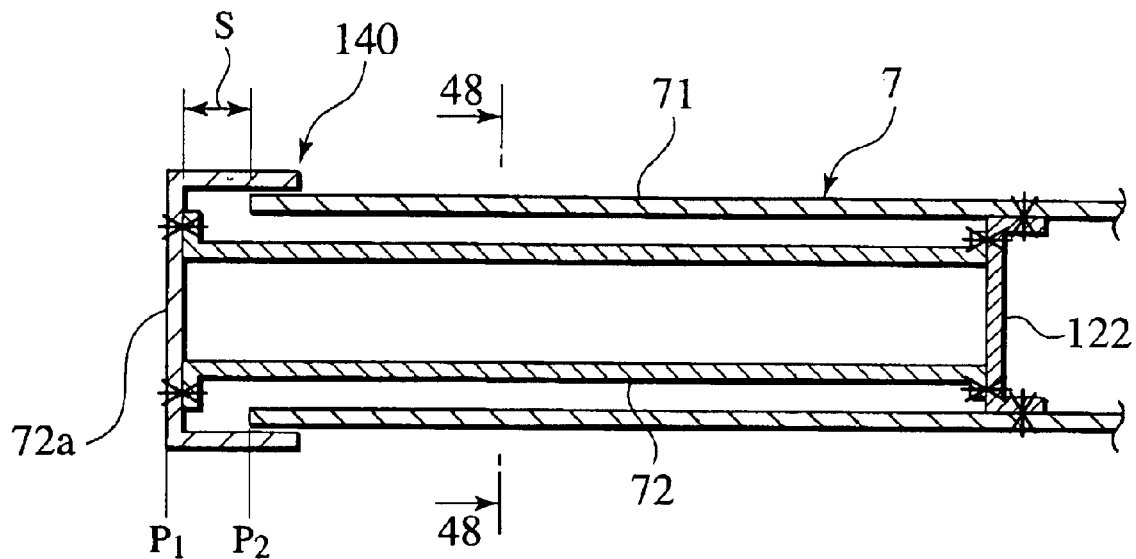
FIG. 47 is a sectional view showing an essential part of the side sill of FIG. 46.
Figure 48:
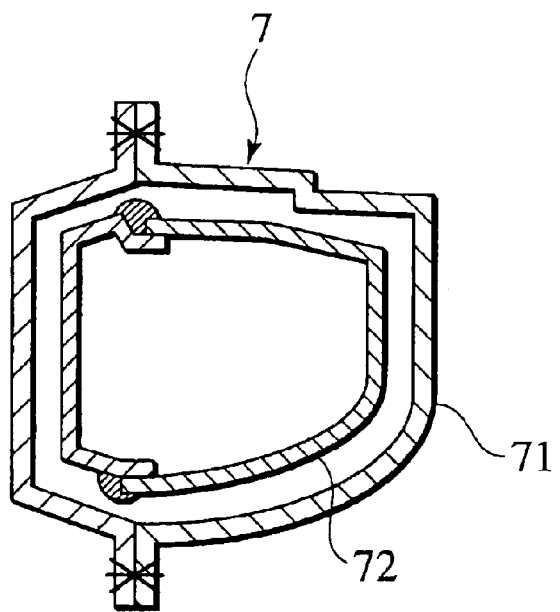
FIG. 48 is a sectional view taken along a line 48—48 of FIG. 47.

As shown in FIGS. 47 and 49, it is established that a position $P_1$ of load-input point for the reinforcement 72 exists ahead of a position $P_2$ of load-input point for the outer member 71 in a direction of a load being inputted to the reinforcing structure. The buckling accelerating mechanism 140 is formed by the establishment of a predetermined clearance S between the position $P_1$ and the position $P_2$.

In detail, as shown in FIG. 47, the reinforcement 72 has its rear end fixed to the bulkhead 122 welded to the outer member 71 and the front end arranged to project from the front end of the outer member 71 forward.

Further, an end plate 72a is welded to the front end of the reinforcement 72 to block up its closed section.

The end plate 72a is in the form of a cap that covers the front end of the outer member 71. In order to allow axial movements mutually, the end plate 72a and the outer member 71 are not welded to each other. In this way, the front face of the end plate 72a provides the position $P_1$ of load-input point for the reinforcement 72, while the front end of the outer member 71 provides the position $P_2$ of load-input point for the outer member 71. Further, the predetermined clearance S is established between the position $P_1$ and the position $P_2$.

Depending on the circumstances, the reinforcement 72 may be divided, at its part intersecting the center pillar 4, into two pieces in front and behind. In connection, the above bulkhead 122 may be replaced by part of a later-mentioned reinforcement 42 (FIG. 59) in the center pillar 4, the reinforcement's part projecting into the side sill 7. In this case, the rear end of the reinforcement 71 is welded to the projecting lower end of the reinforcement 42 in the center pillar 4.

Figure 50:
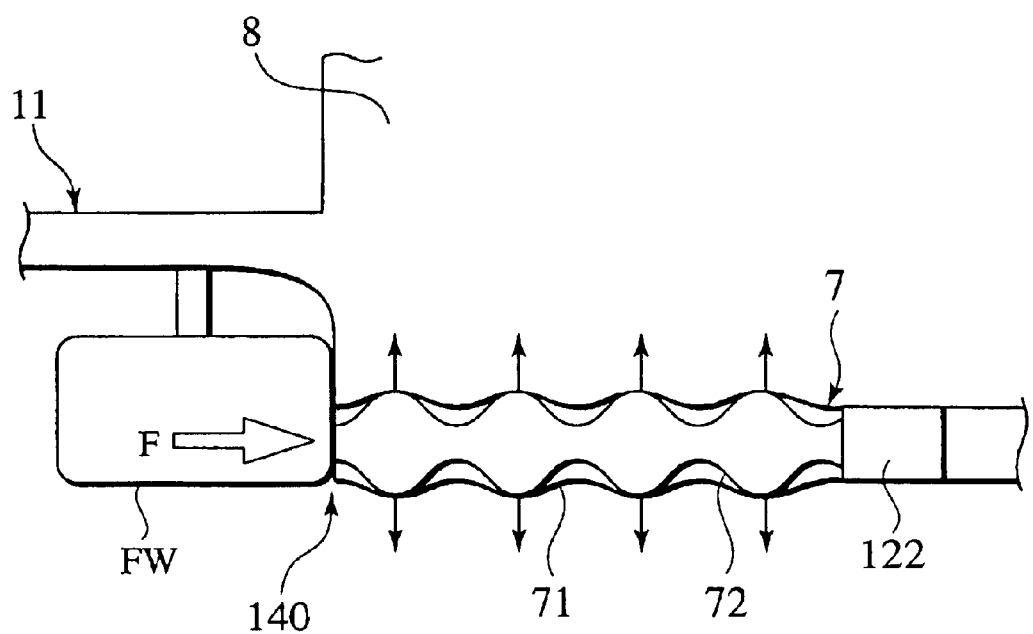
FIG. 50 is a plan view showing the operation of the side sill of FIG. 46 schematically.

FIGS. 49 and 50 show the operation of the above-constructed side sill 7 when it is subjected to an external force F by a vehicle front collision.

With the vehicle front collision, a front wheel FW is moved back to collide with the front end of the side sill 7, so that a collision load (external force) F is applied on the side sill 7 in the axial direction.

Then, owing to the above-mentioned arrangement of the reinforcement 72 and the outer member 71 both forming the side sill 7, the front wheel FW collides with the front end of the reinforcement 72 at first. In this way, a period of starting the buckling of the reinforcement 72 is advanced in comparison with that of the outer member 71.

Therefore, the growth of an amplitude of waveform is promoted in the buckling-mode waveform SB of the reinforcement 72. Thus, the amplitude of the waveform SB is increased, as shown in FIG. 53.

When the reinforcement 72 is buckled by the above clearance S, the end plate 72a collides with the front end of the outer member 71. That is, with a delay time (t) necessary for the reinforcement 72 to be buckled by the clearance S, the collision load F is inputted to the outer member 71 in the axial direction. Due to this delay time (t), the growth of an amplitude of deformation of the outer member 71 is restricted against the reinforcement 72. As shown in FIG. 53, the outer member 71 is deformed with a buckling-mode waveform SA whose amplitude is smaller than the amplitude of the reinforcement 72.

Consequently, as shown in FIG. 50, respective antinodes of the waveform of the reinforcement 72 having a large amplitude interfere with respective antinodes of the waveform of the outer member 71 having a small amplitude along the longitudinal direction of the side sill 7. A resistance force by the above interference operates to restrict the growth of a local deformation on the reinforcement 72. Not only the reinforcement 72, but also the growth of a local deformation on the side sill 7 is restricted to avoid its folding. Thus, the collision load F is shared between the reinforcement 72 and the outer member 71 to disperse a deformation into the whole side sill 7. Additionally, with the increase of resistance force due to the above mutual interference, a reaction force against collapse can be enhanced to increase an energy consumption of the side sill 7.

Figure 51:
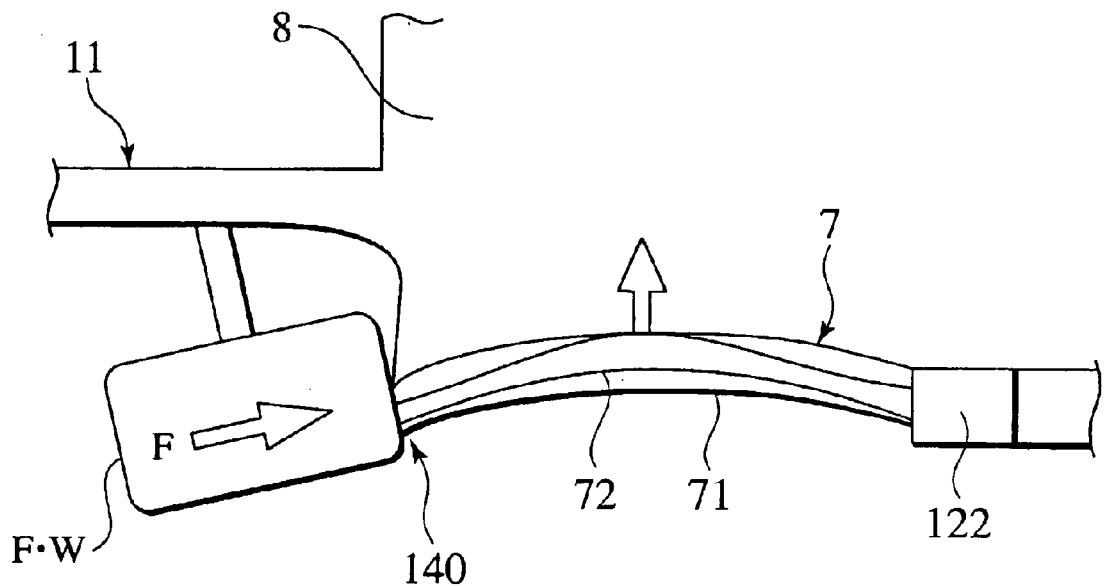
FIG. 51 is a plan view showing a different example of the operation of the side sill of FIG. 46 schematically.

At an oblique collision in front, if the front wheel FW collides with the side sill 7 from its oblique outside as shown in FIG. 51, then a collision load F is applied on the side sill 7 obliquely. As a result, the side sill 7 is curved inward in plan view. Similarly in this case, since a resistance force is increased by the above interference among antinodes of the waveforms of the reinforcement 72 and the outer member 71, it is possible to restrict an inward deformation of the side sill 7.

Therefore, without either increasing the plate-thicknesses of the reinforcement 72 and the outer member 71 or installing more reinforcement, the reinforcing effect for the side sill 7 can be enhanced to improve the sill's performance against collision.

According to the third embodiment of the invention, the buckling accelerating mechanism 140 advances the time of starting the buckling of the reinforcement 72 by the predetermined time (t) in comparison with the time of starting the buckling of the outer member 71 to make the amplitude of the buckling-mode waveform of the reinforcement 72 larger than the amplitude of the buckling-mode waveform of the outer member 71. Therefore, with the simple structure of the side sill 7, in other words, the positioning of the load-input points on the reinforcement 72 and the outer member 71 and the establishment of the clearance S, it is possible to enhance the reinforcing effect against the side sill 7.

[1st. Modification]

Figure 55:
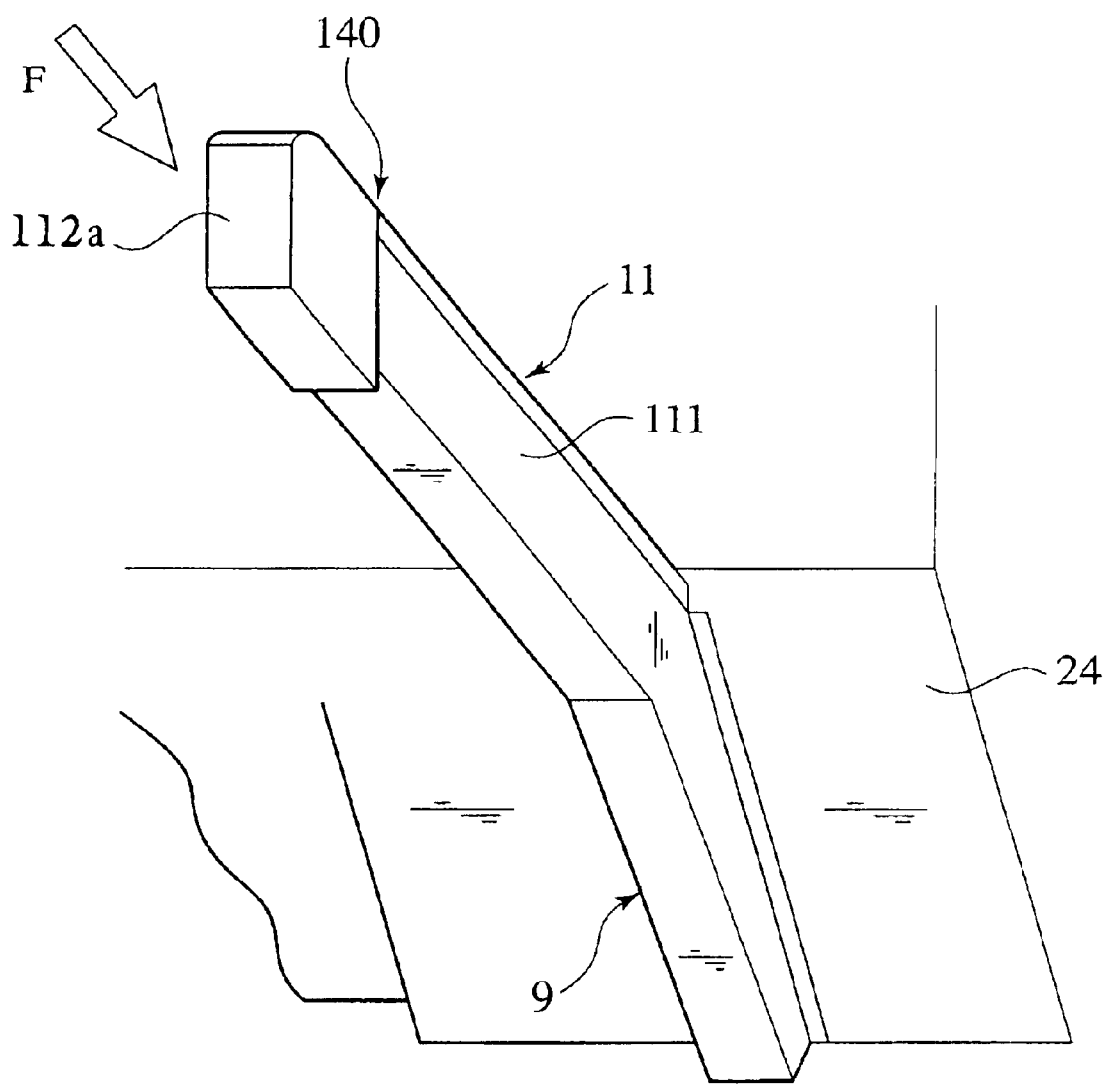
FIG. 55 is a perspective view showing a front side member in a first modification of the third embodiment.
Figure 56:
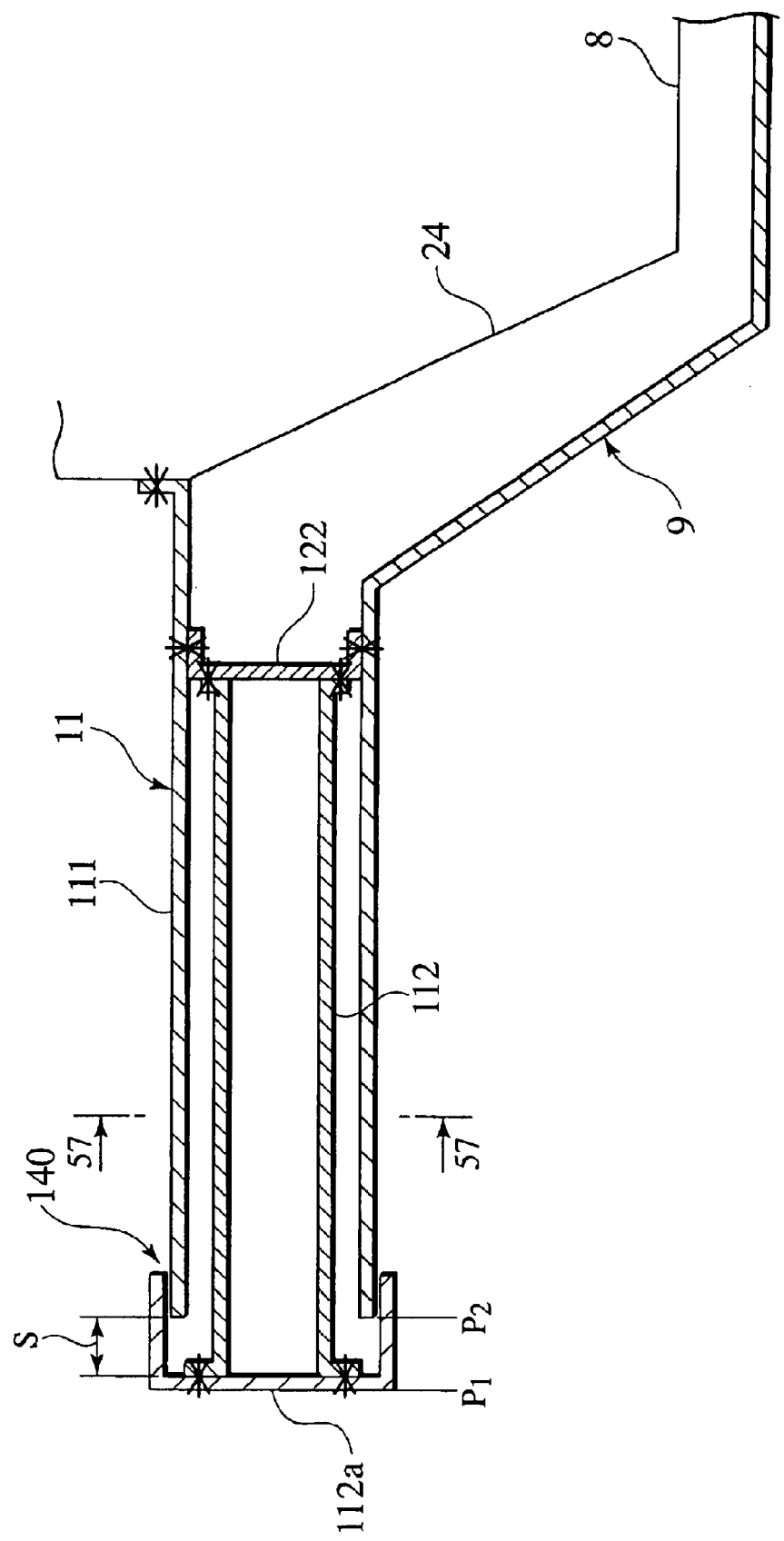
FIG. 56 is a sectional view of the front side member of FIG. 55.
Figure 57:
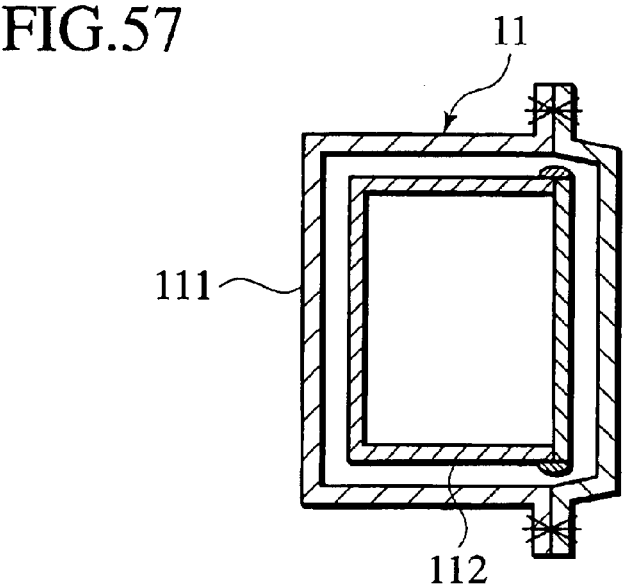
FIG. 57 is a sectional view taken along a line 57—57 of FIG. 56.

FIGS. 55 to 57 show the first modification of the third embodiment. In the modification, the buckling accelerating mechanism 140 is applied to the front side member 11.

The front side member 11 includes the outer member 111 having a hollow (closed) section and the reinforcement 112 arranged in the outer member 111 to extend in the longitudinal direction of the outer member 111.

The reinforcement 112 has its rear end fixed to the bulkhead 122 welded to the outer member 111 and the front end arranged to project from the front end of the outer member 111 forward.

Further, the reinforcement 112 has its front end welded to a cap-shaped end plate 112a. In order to allow axial movements mutually, the end plate 112a and the front end of the outer member 111 are not welded to each other. In this way, the front face of the end plate 112a provides the position $P_1$ of load-input point for the reinforcement 112, while the front end of the outer member 111 provides the position $P_2$ of load-input point for the outer member 111. Further, a predetermined clearance S is established between the position $P_1$ and the position $P_2$, thereby forming the buckling accelerating mechanism 140.

Consequently, when a collision load F is applied on the front end of the front side member 11 by a vehicle front collision, the operation and effect similar to the third embodiment mentioned above are obtained.

[2nd. Modification]

Figure 58:
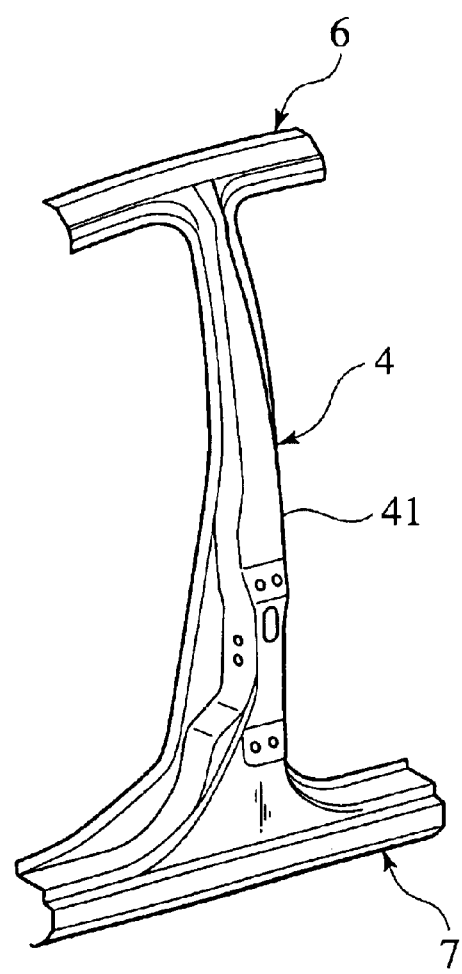
FIG. 58 is a perspective view showing a center pillar in a second modification of the third embodiment.
Figure 59:
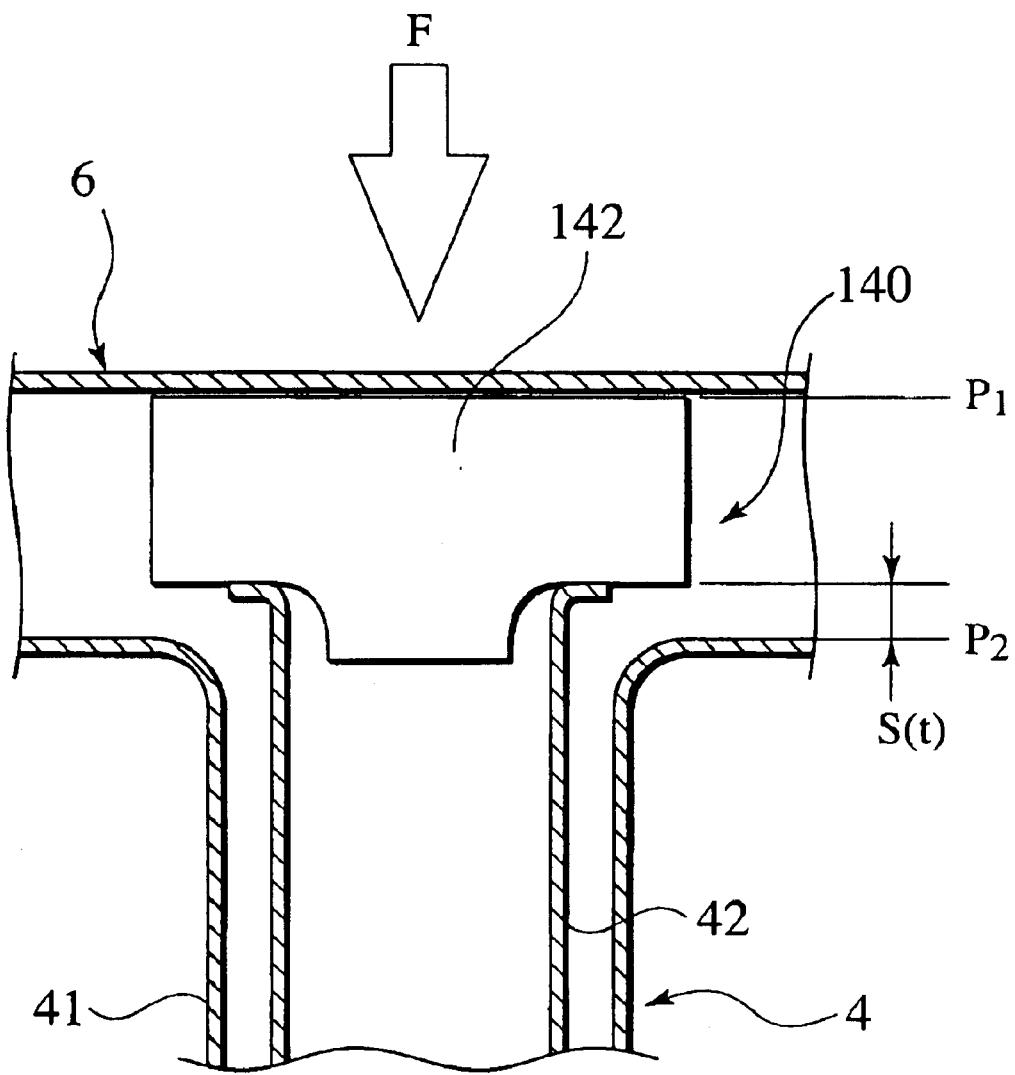
FIG. 59 is a side view showing a section of an essential part of the center pillar of FIG. 58.
Figure 60:
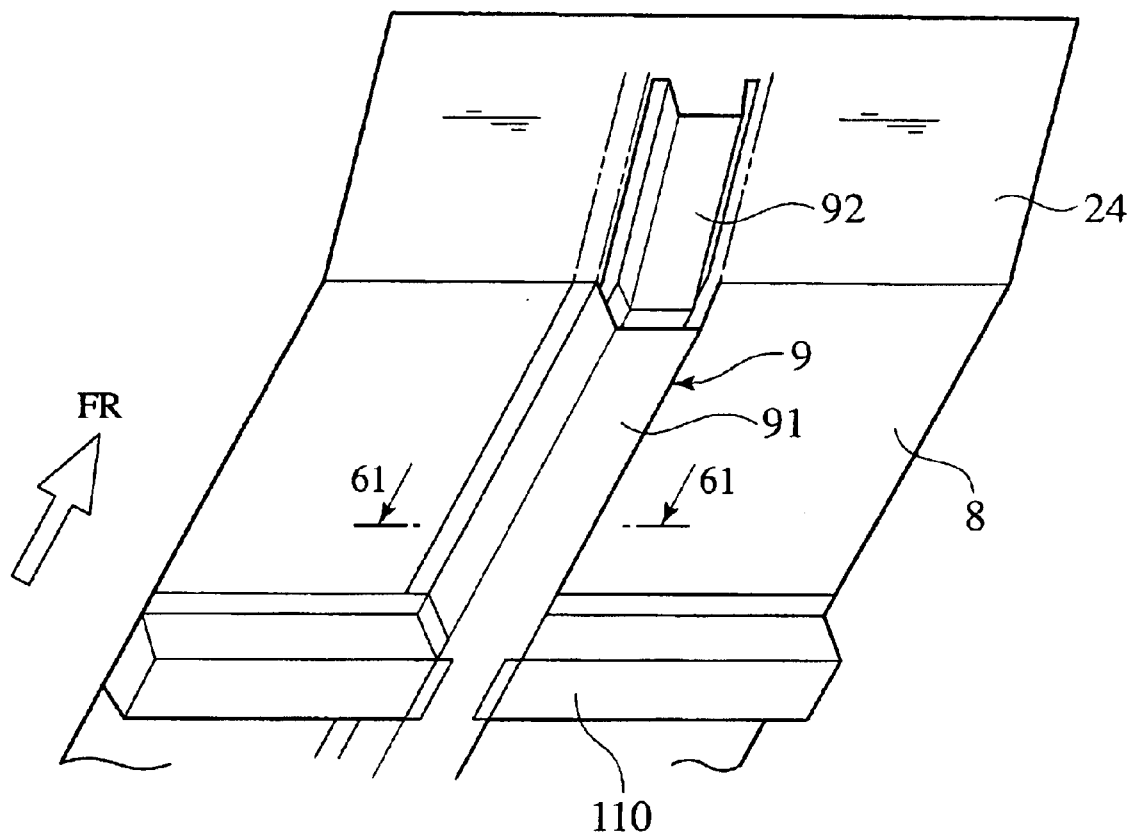
FIG. 60 is a perspective view of a side member extension in accordance with a third modification of the third embodiment of the invention, viewed from the underside of the vehicle floor.
Figure 61:
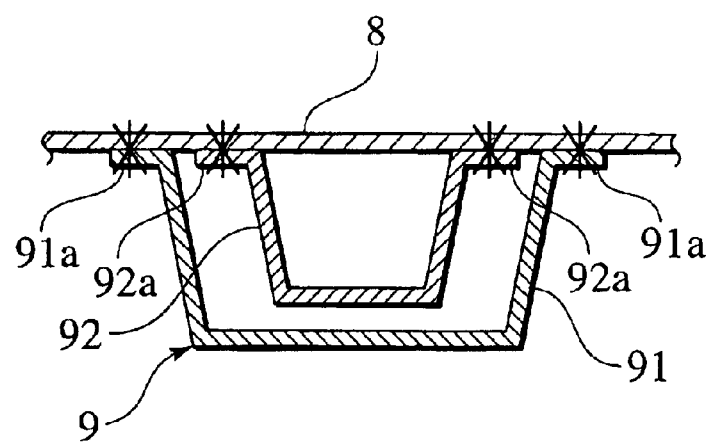
FIG. 61 is a sectional view taken along a line 61—61 of FIG. 60.

FIGS. 58 and 59 shows the second modification of the third embodiment. In the modification, the buckling accelerating mechanism 140 is applied to the center pillar 4.

The center pillar 4 includes the outer member 41 having a hollow (closed) section to form a shell of the pillar 4 and the reinforcement 42 arranged in the outer member 41 to extend in the longitudinal direction of the outer member 41. The reinforcement 42 is formed to have a closed section smaller than that of the outer member 41.

The lower end of the reinforcement 42 is connected to the side sill 7, while the upper end of the reinforcement 42 is arranged to project into the closed section of the roof side rail 6 and welded to a bulkhead 142 of T-shaped configuration in side view. Through this bulkhead 142, the reinforcement 42 is joined to the roof side rail 6.

The top end of the bulkhead 142 is arranged to abut against or approach the upper wall of the roof side rail 6, so that the top end of the bulkhead 142 provides the position $P_1$ of load-input point for the reinforcement 42. While, a connection of the front end of the outer member 41 with the lower wall of the roof side rail 6 provides the position $P_2$ of load-input point for the outer member 41. Further, a predetermined clearance S is established between the lower end of a shoulder part of the bulkhead 142 and the position $P_2$, thereby forming the buckling accelerating mechanism 140.

According to the second modification, when a collision load F is inputted to the roof side rail 6 from its upside, the collision load F is immediately transmitted to the reinforcement 42 through the bulkhead 142, so that the reinforcement 42 begins to be buckled in the axial direction. When the reinforcement 42 is deformed by the clearance S, the lower end of the shoulder part of the bulkhead 122 comes into pressure contact with the upper end of the outer member 41. Thus, the axial load is transmitted to the outer member 41 with a delay of a predetermined period (t), thereby starting the axial buckling of the outer member 41.

In this way, it is possible to promote the growth of an amplitude of the buckling-mode waveform of the reinforcement 42 against the outer member 41, whereby the large amplitude of the deformation of the reinforcement 42 can be realized to obtain the waveform characteristics similar to those of FIGS. 53 and 54.

As a result, there is produced interference of antinodes in the buckling-waveforms between the outer member 41 and the reinforcement 42 throughout the center pillar 4, so that the growth of local deformation of the reinforcement 42 is restricted by a resistance force due to the above interference. That is, the growth of local deformation of the center pillar 4 is restricted to avoid the folding of the center pillar 4 and additionally, the load F is shared between the reinforcement 42 and the outer member 41. Consequently, the deformation is dispersed to the whole center pillar 4. Further, since a resistance force is increased by the mutual interference, it is possible to enhance a reaction force against collapse.

(3rd. Modification)

FIGS. 60 to 63 show the third modification of the third embodiment. In the modification, the buckling accelerating mechanism 140 is applied to the side member extension 9.

As mentioned before, the side member extension 9 is connected to the rear end of the front side member 11 (see FIG. 1) joined to the inclined toe-board face of the dash panel 24. The side member extension 9 is arranged to extend along the underface of the floor panel 8 in the fore-and-aft direction of the vehicle.

Beneath the floor panel 8, the side member extension 9 intersects with the floor cross member 110 at substantial right angles. The floor cross member 110 is welded to the underface of the floor panel 8 in the width direction of the vehicle.

The side member extension 9 includes the outer member 91 forming a hollow (closed) section together with the panels 24, 8 thereby forming a shell of the side member extension 9 and the reinforcement 92 arranged in the outer member 91 to extend in the longitudinal direction of the outer member 91. The outer member 91 is formed to have a substantial hat-shaped section. The front end of the outer member 91 is fitted to the rear end of the front side member 11 from its outside. The outer member 91 is welded to the inclined face of the dash panel 24 and the underface of the floor panel 8 through flanges 91a.

The reinforcement 92 is formed to have a substantial hat-shaped section smaller than that of the outer member 91. Independently of the outer member 91, the reinforcement 92 is welded to the panels 24, 8 through flanges 92a, forming a hollow (closed) section together with the panels 24, 8.

According to the third modification of the third embodiment, the reinforcement 92 is provided with a deformation-mode adjusting mechanism 150 (FIG. 62B) which makes an amplitude of the buckling-mode waveform of the reinforcement 92 larger than an amplitude of the buckling-mode waveform of the outer member 91.

This deformation-mode adjusting mechanism 150 is formed by a strength-variable part provided in the reinforcement 92. This strength-variable part includes a plurality of weakened parts formed on a horizontal top wall 92b of the reinforcement 92 along the floor panel 8. The weakened parts are in the form of beads 151 (151a, 151b) juxtaposed in the fore-and-aft direction of the top wall 92b.

Figure 62B:
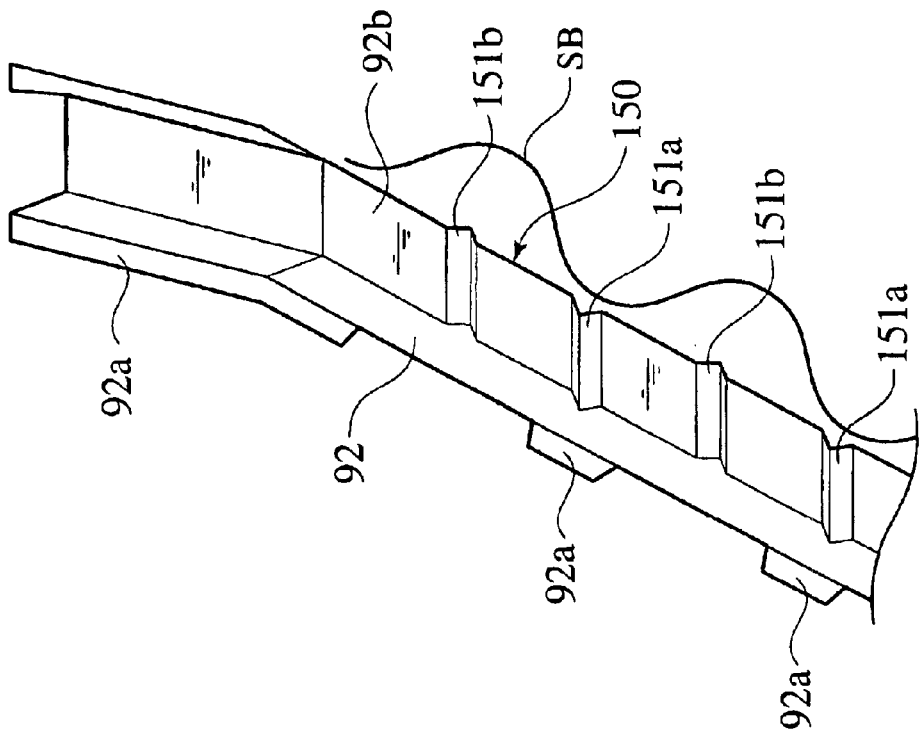
FIG. 62b is a perspective view showing the buckling-mode waveforms of a reinforcement of both forming the side member extension of FIG. 60.
Figure 62A:
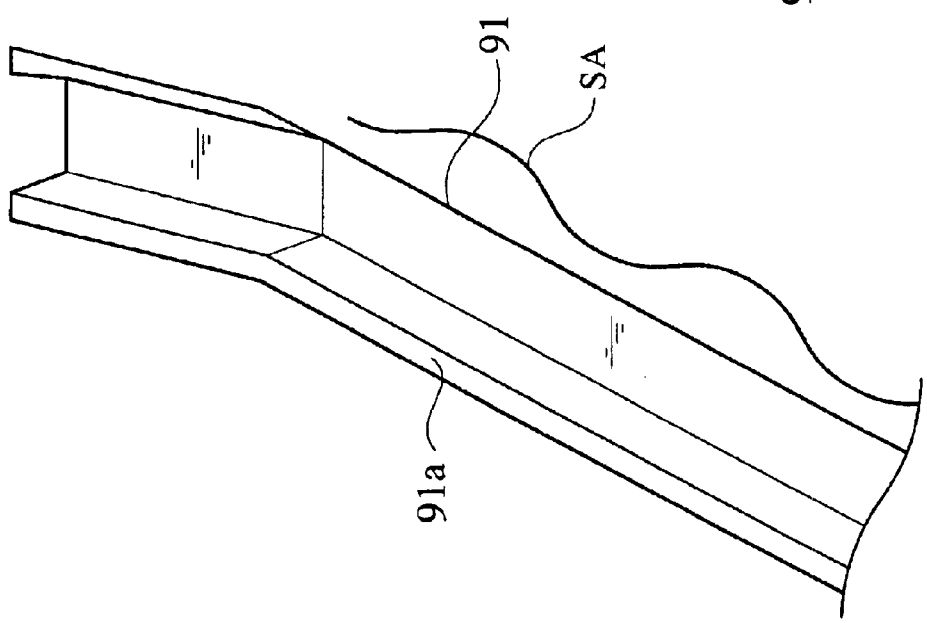
FIG. 62a is a perspective view showing the buckling-mode waveform of an outer member of the side member extension of FIG. 60.
Figure 63:
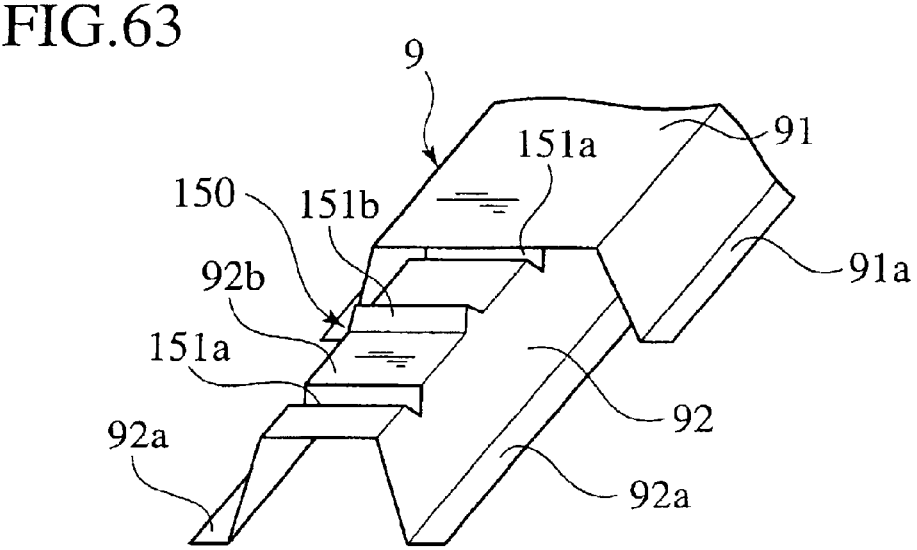
FIG. 63 is an enlarged perspective view showing a part of adjusting mechanism of FIG. 62.

Here, as shown in FIG. 62A, it is assumed that the axial buckling-mode waveform SA of the horizontal part of the outer member 91 along the vehicle floor face is established at a required "waveform" pitch in the longitudinal direction of the member 91 while making the front end of the horizontal part one node of the waveform. Then, the above beads 151 of the reinforcement 92 are formed sideways in respective positions corresponding to respective nodes and antinodes of the buckling-mode waveform SA.

In detail, as shown in FIG. 62B, the beads 151 comprise a plurality of beads 151a in the form of dents, which are arranged in respective positions corresponding to the nodes of the buckling-mode waveform SA, and a plurality of beads 151b in the form of projections, which are arranged in respective positions corresponding to the antinodes of the buckling-mode waveform SA. As a result, when the horizontal part of the reinforcement 92 is subjected to an axial load through its front end, the reinforcement 92 is deformed in a buckling-mode waveform SB with nodes of the beads 151a in the form of dents. It is noted that a pitch of the buckling-mode waveform SB is identical to the pitch of the buckling-mode waveform SA b in the buckling-mode waveform SA. Further, in the antinodes of the buckling-mode waveform SB, an outward displacement of the reinforcement 92 is increased by the beads 151b in the form of projections, providing the buckling-mode waveform SB having a large amplitude of deformation.

In the respective areas corresponding to the antinodes of the buckling-mode waveform SB, the flanges 92a are partially eliminated. That is, only in these areas, the reinforcement 72 is not welded to the floor panel 8, preventing the flanges 92a from being hindrances to the outward deformation of the reinforcement 92.

In operation, when an axial load is applied on the side member extension 9 by a vehicle front collision, the above horizontal part of the outer member 91 is buckled in a wavy manner with the buckling-mode waveform SA.

On the other hand, the horizontal part of the reinforcement 92 is also buckled, from its front end in the axial direction, in the form of a wave in substantial synchronization with the outer member 91 and also in the same pitch as the outer member's pitch. Nevertheless, in the reinforcement's portion corresponding to each antinode of the waveform of the outer member 91, a curve-shaped buckling is promoted by the projecting bead 151b on the top wall 92b. In the buckling-mode waveform SB of the whole reinforcement 92 in the longitudinal direction, as shown in FIG. 62B, the growth of an amplitude of the waveform is progressed to increase an amplitude of deformation, thereby accomplishing the waveform characteristics similar to those of FIGS. 53 and 54.

As a result, the antinodes in the buckling-waveform of the outer member 91 interfere with the antinodes in the buckling-waveform of the reinforcement 92, so that a resulting resistance force operates to restrict the growth of local deformation of the reinforcement 92 to avoid the folding of the side member extension 9. Additionally, the collision load F is shared between the reinforcement 92 and the outer member 91 to allow a deformation to be dispersed to the whole side member extension 9. Additionally, owing to the increasing of the resistance force resulting from the mutual interference, it is possible to enhance a reaction force against collapse.

Particularly, since the strength-variable part in the form of beads is formed in the reinforcement 92 to attain a great amplitude of the buckling-mode waveform of the reinforcement 92, it is possible to reduce the manufacturing cost without being accompanied with modifications in the outer member 91.

The formation of the strength-variable part can be simplified by the provision of the beads 151. Furthermore, owing to the design of the beads 151, it is possible to adjust the deformation mode of the reinforcement 92 with ease.

[4th. Modification]

Figure 64:
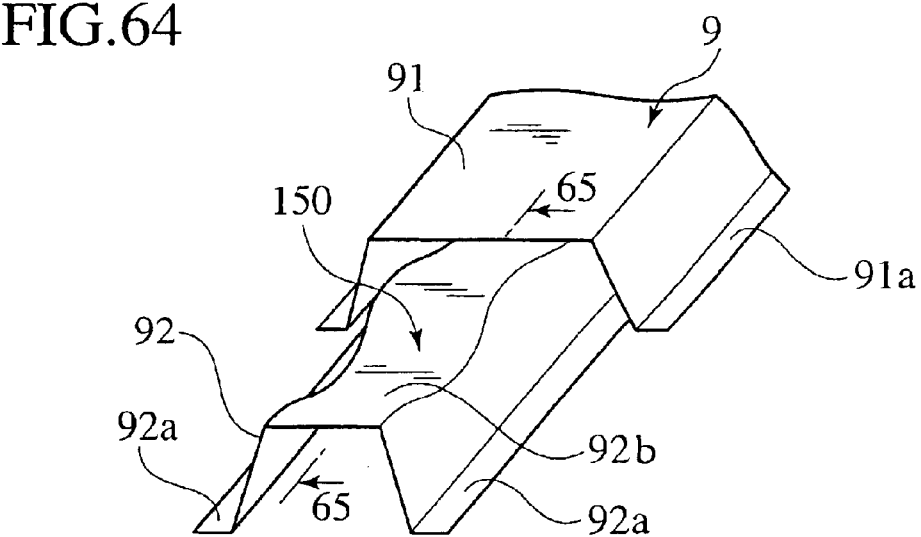
FIG. 64 is a perspective view showing a fourth modification of the third embodiment, similar to FIG. 62.

FIG. 64 shows the fourth modification of the third embodiment, which is similar to the third modification.

According to this modification, the top wall 92b of the reinforcement 92 is shaped just like a smooth wave succeeding in the longitudinal direction, providing the above-mentioned deformation-mode adjusting mechanism 150 that makes the amplitude of the buckling-mode waveform of the reinforcement 92 larger than the amplitude of the buckling-mode waveform of the outer member 91.

It goes without saying that respective peaks and troughs in a waveform on the top wall 92b are formed to correspond to antinode and nodes in the buckling-mode waveform of the reinforcement 92, respectively.

Thus, according to the fourth modification, it is possible to neatly accomplish a wave-shaped buckling deformation of the reinforcement 92 due to the "peaks" and "troughs" in the waveform of the top wall 92b, thereby allowing the reinforcement 92 to be deformed in the buckling-mode waveform SB whose amplitude of deformation is larger than the amplitude of the buckling-mode waveform SA of the outer member 91.

(5th. Modification)

Figure 65:
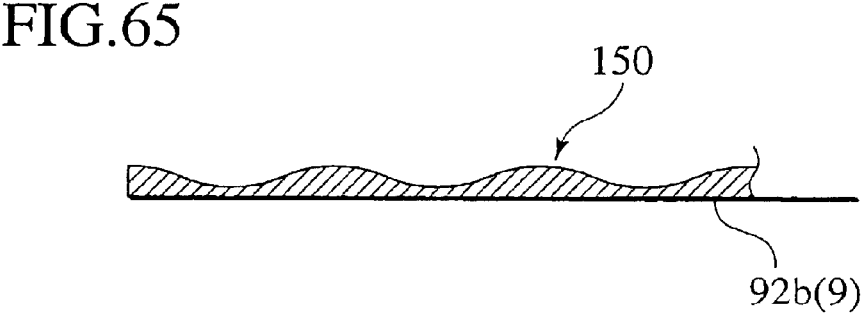
FIG. 65 is a sectional view similar to a sectional view taken along a line is 65—65 of FIG. 64, showing a fifth modification of the third embodiment of the invention.

FIG. 65 shows the fifth modification similar to the fourth modification of the third embodiment. In this modification, respective "peak" portions in the wave on the top wall 92b of the reinforcement 92 are formed as thick-walled parts each having a large thickness, while "trough" portions are formed as thin-walled parts each having a small thickness. The thick-walled parts and the thin-walled parts are arranged alternately in the longitudinal direction of the reinforcement 92.

According to the fifth modification mentioned above, since the wave-shaped buckling deformation of the reinforcement 92 is induced at respective troughs of the thin-walled parts as the starting points of deformation, it is possible to perform the deformation in the buckling-mode waveform SB more neatly. Further, since the thick-walled peak portions of the reinforcement 92 come into intensive contact with respective "antinode" portions in the buckling-waveform of the outer member 91, it is possible to enhance a resistance force of the whole assembly of the outer member 91 and the reinforcement 92.

Finally, it will be understood by those skilled in the art that the foregoing descriptions are nothing but some embodiments of the disclosed reinforcing structure for the body frame of the vehicle. Besides these embodiments, various changes and modifications may be made to the present invention without departing from the spirit and scope of the invention.

Japanese Patent Applications No. 2002-7907, 2002-143235 and 2002-143245 are expressly incorporated herein by reference in its entirety.

The scope of the invention is defined with reference to the following claims.

What is claimed is:

1. A reinforcing structure for a body frame of a vehicle, comprising:
    a framework member having two wall members adjacent to each other to provide a peripheral wall of the framework member with a double wall structure; and
    an adjusting mechanism for adjusting respective buckling-mode waveforms of the two wall members to be different from each other.

2. The reinforcing structure of claim 1, wherein the adjusting mechanism adjusts to make the buckling-mode waveform of a first wall member in a substantially-reversed phase to the buckling-mode waveform of a second wall member.

3. The reinforcing structure of claim 2, wherein the adjusting mechanism comprises a wall face of the first wall member, the wall face being shaped to be a continuous and smooth wave.

4. The reinforcing structure of claim 2, wherein the adjusting mechanism comprises a plurality of embossed parts formed in rows on a wall face of the first wall member.

5. The reinforcing structure of claim 2, wherein the adjusting mechanism comprises thick-walled parts and thin-walled parts both formed in the first wall member alternately.

6. The reinforcing structure of claim 2, wherein the adjusting mechanism comprises a plurality of beads formed on a wall face of the first wall member.

7. The reinforcing structure of claim 6, wherein the two wall members are identical to each other in terms of plate thickness and structure.

8. The reinforcing structure of claim 6, wherein the two wall members are different from each other in terms of plate thickness and structure.

9. The reinforcing structure of claim 6, wherein the first wall member is an inside wall member forming the double wall structure.

10. The reinforcing structure of claim 1, wherein the second wall member is an outer member having a closed section, while the first wall member is a reinforcement arranged in the outer member to extend in the longitudinal direction, and the adjusting mechanism adjusts respective buckling-mode waveforms of the wall members so that an amplitude of the buckling-mode waveform of the reinforcement is smaller than an amplitude of the buckling-mode waveform of the outer member.

11. The reinforcing structure of claim 10, wherein the adjusting mechanism comprises a buckling delay mechanism arranged in the reinforcement to delay a time of starting the buckling of the reinforcement against a time of starting the buckling of the outer member, thereby making the amplitude of the buckling-mode waveform of the reinforcement smaller than the amplitude of the buckling-mode waveform of the outer member.

12. The reinforcing structure of claim 11, wherein the buckling delay mechanism is formed by a weakened part provided in the reinforcement.

13. The reinforcing structure of claim 11, wherein the buckling delay mechanism is formed by a wall face of the reinforcement, the wall face being shaped to be a smooth and continuous wave.

14. The reinforcing structure of claim 11, wherein the buckling delay mechanism is formed by thick-walled parts and thin-walled parts both formed in the reinforcement alternately.

15. The reinforcing structure of claim 11, wherein the buckling delay mechanism is formed by a clearance defined between the outer member and the reinforcement to delay transmission of a load from the outer member to the reinforcement, the clearance extending in a direction of the load being inputted to the outer member.

16. The reinforcing structure of claim 10, wherein the adjusting mechanism comprises a buckling restricting mechanism arranged in the reinforcement to restrict the buckling of the reinforcement, thereby making the amplitude of the buckling-mode waveform of the reinforcement smaller than the amplitude of the buckling-mode waveform of the outer member.

17. The reinforcing structure of claim 16, wherein the buckling restricting mechanism includes a plurality of axial beads formed on a wall of the reinforcement at predetermined intervals in the longitudinal direction of the reinforcement.

18. The reinforcing structure of claim 17, wherein the buckling restricting mechanism further includes a plurality of lateral beads formed on the wall of the reinforcement and each arranged between the adjoining axial beads to extend in a direction perpendicular to the axial beads.

19. The reinforcing structure of claim 1, wherein the second wall member is an outer member having a closed section, while the first wall member is a reinforcement arranged in the outer member to extend in the longitudinal direction, and the adjusting mechanism adjusts respective buckling-mode waveforms of the wall members so that an amplitude of the buckling-mode waveform of the reinforcement is larger than an amplitude of the buckling-mode waveform of the outer member.

20. The reinforcing structure of claim 19, wherein the adjusting mechanism comprises a buckling accelerating mechanism arranged in the reinforcement to accelerate a time of starting the buckling of the reinforcement against a time of starting the buckling of the outer member, thereby making the amplitude of the buckling-mode waveform of the reinforcement larger than the amplitude of the buckling-mode waveform of the outer member.

21. The reinforcing structure of claim 20, wherein the buckling accelerating mechanism is formed by a load-input point for the reinforcement which is positioned in front of another load-input point for the outer member in a direction of a load being inputted to the reinforcing structure, and a clearance defined between the load-input point for the reinforcement and the load-input point for the outer member, the clearance extending in the direction of the load being inputted.

22. The reinforcing structure of claim 19, wherein the reinforcement is provided with a deformation-mode adjusting mechanism which makes the amplitude of the buckling-mode waveform of the reinforcement larger than the amplitude of the buckling-mode waveform of the outer member.

23. The reinforcing structure of claim 22, wherein the deformation-mode adjusting mechanism is formed by a strength-variable part provided in the reinforcement.

24. The reinforcing structure of claim 23, wherein the strength-variable part is a weakened part formed in the reinforcement.

25. The reinforcing structure of claim 22, wherein the deformation-mode adjusting mechanism is formed by a wall face of the reinforcement, the wall face being shaped to be a smooth and continuous wave.

26. The reinforcing structure of claim 22, wherein the deformation-mode adjusting mechanism is formed by thick-walled parts and thin-walled parts both formed in the reinforcement alternately.

27. A reinforcing structure for a body frame of a vehicle, comprising:

a framework member having two wall members adjacent to each other to provide a peripheral wall of the framework member with a double wall structure; and means for adjusting respective buckling-mode waveforms of the two wall members to be different from each other.

* * * * *